United States Patent
Song et al.

(10) Patent No.: US 8,515,398 B2
(45) Date of Patent: Aug. 20, 2013

(54) MOBILE TERMINAL AND METHOD FOR MANAGING PHONE BOOK DATA THEREOF

(75) Inventors: Jiyoung Song, Seoul (KR); Youngseung Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 390 days.

(21) Appl. No.: 12/826,376

(22) Filed: Jun. 29, 2010

(65) Prior Publication Data

US 2011/0053570 A1    Mar. 3, 2011

(30) Foreign Application Priority Data

Aug. 25, 2009  (KR) .................. 10-2009-0078521
Jan. 15, 2010  (KR) .................. 10-2010-0004076

(51) Int. Cl.
*H04M 3/42*         (2006.01)

(52) U.S. Cl.
USPC ............... 455/414.1; 455/566; 455/550.1; 348/14.02; 348/14.14; 715/810; 715/838; 715/716; 382/118; 382/305

(58) Field of Classification Search
USPC .............. 455/414.1, 566, 550.1; 346/14.02, 346/14.14; 715/810, 838, 716; 382/118, 382/305

See application file for complete search history.

(56) References Cited

U.S. PATENT DOCUMENTS

| | | | |
|---|---|---|---|
| 6,754,894 B1 * | 6/2004 | Costello et al. | 717/169 |
| 8,189,028 B2 * | 5/2012 | Bang et al. | 348/14.02 |
| 2006/0052091 A1 * | 3/2006 | Onyon et al. | 455/415 |
| 2006/0063514 A1 * | 3/2006 | Choi et al. | 455/414.1 |
| 2008/0052312 A1 * | 2/2008 | Tang et al. | 707/104.1 |
| 2008/0146274 A1 * | 6/2008 | Cho | 455/556.1 |

* cited by examiner

*Primary Examiner* — Nimesh Patel
(74) *Attorney, Agent, or Firm* — Birch, Stewart, Kolasch & Birch, LLP

(57) ABSTRACT

A mobile terminal and a method for managing various phone book data of the mobile terminal are disclosed. A file name of a photo received from the external source or a captured photo are compared with the phone book information and automatically stored in the phone book, thereby minimizing the user manipulation and the process of storing the photo data of the phone book. Also, when a photo of a particular user is selected, a phone book photo is requested from a corresponding user according to a certain requesting method, and when the phone book photo is received from the counterpart user, the corresponding photo is added or updated as a phone book photo, thus improving user convenience.

4 Claims, 27 Drawing Sheets

FIG. 15B
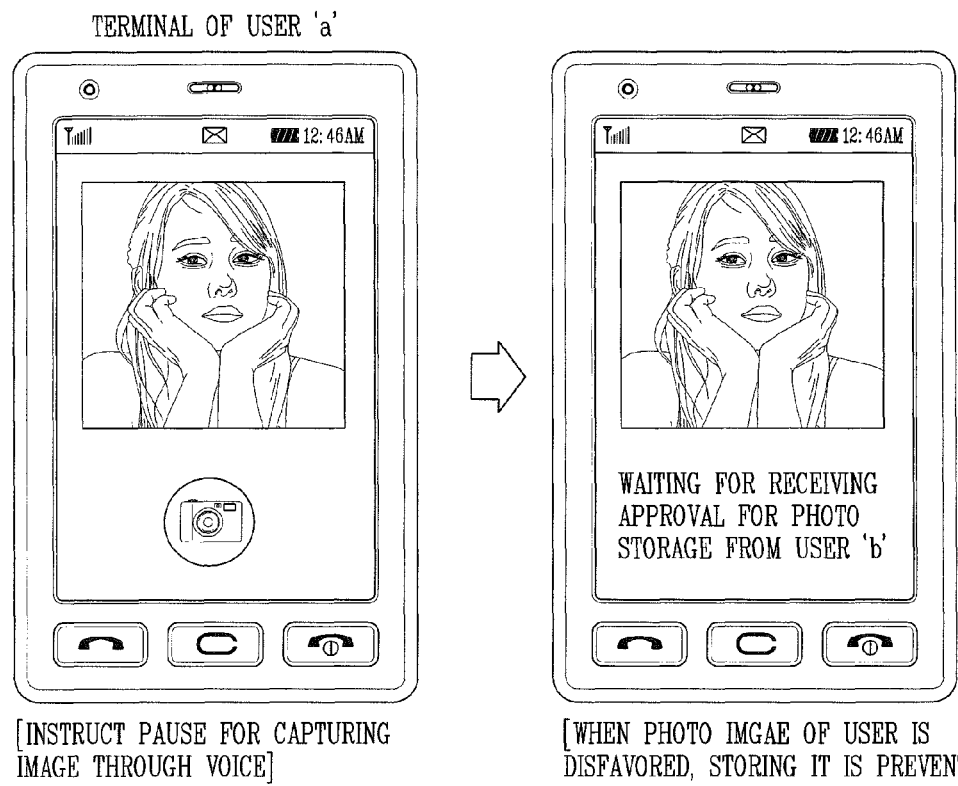
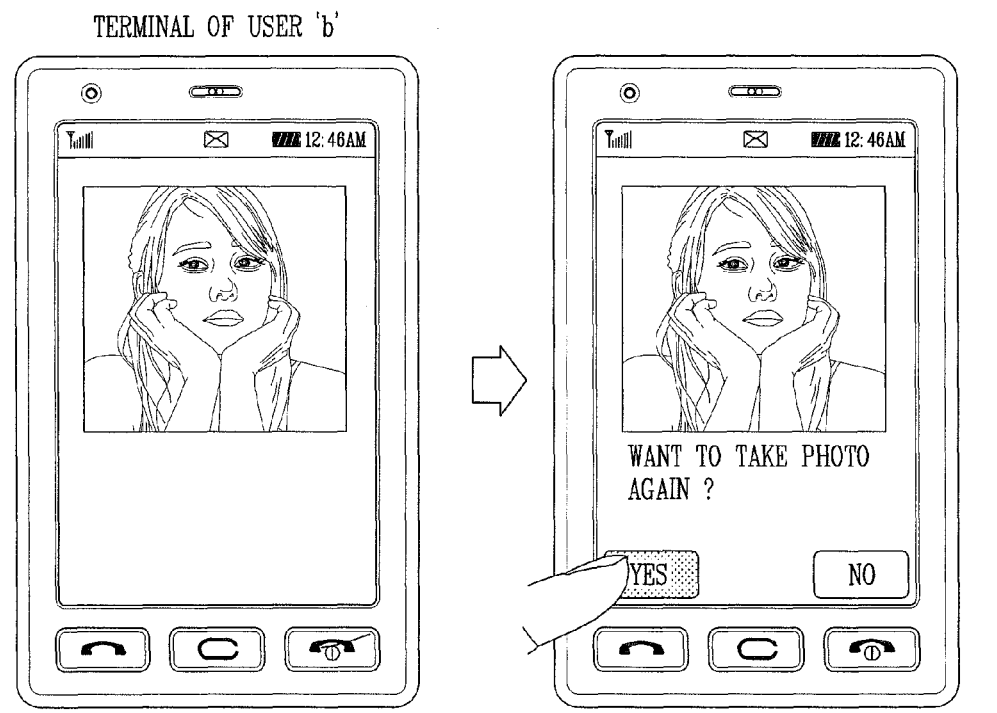

MOBILE TERMINAL AND METHOD FOR MANAGING PHONE BOOK DATA THEREOF

CROSS REFERENCE TO RELATED APPLICATIONS

Pursuant to 35 U.S.C. §119, this application claims the benefit of Korean Application Nos. 10-2009-0078521 and 10-2010-0004076 filed on Aug. 25, 2009 and Jan. 15, 2010, respectively, and content of which is hereby incorporated by reference herein in its entirety.

BACKGROUND OF THE INVENTION

1. Field of the Invention

The present invention relates to data management and, more particularly, to a mobile terminal capable of effectively storing and updating phone book photos and a method for managing phone book photos of the mobile terminal.

2. Description of the Related Art

A mobile terminal may be configured to perform diverse functions. Such diverse functions may include a data and voice communication function, a function of capturing a photo or video through a camera, a voice storage function, a music file reproducing function through a speaker system, an image or video display function, and the like. Some mobile terminals include an additional function allowing playing games, and other mobile terminals are implemented as multimedia players. Recently, mobile terminals allow users to receive broadcast or multicast signals to view video or television programs.

Efforts are ongoing to support and increase the functionality of mobile terminals. Such efforts include software and hardware improvements, as well as changes and improvements in the structural components which form the mobile terminal.

A touch function of a mobile terminal allows a user who is not familiar to a button/key input to conveniently operate the mobile terminal by using a touch screen, taking a hold as a key function of terminals along with a user interface (UI) as well as simple inputs.

In general, a mobile terminal includes a phone book function allowing the user to conveniently manage multiple names, phone numbers, addresses, e-mail addresses of people (i.e., counterpart users). In particular, recently, as a memory capacity of a mobile terminal increases, the amount of data that can be stored in a phone book has been drastically increased, an information such as photos, limited video, and the like, can be managed. Also, with a camera function installed therein, the mobile terminal includes a photo registration function allowing the user to input a photo of a corresponding user in registering user information in the phone book.

Various data stored in the phone book is managed in the form of a database, and in order to easily search for people stored in the phone book, the data may be grouped by friend, co-worker, family member, relative, or the like, so as to be managed. Thus, the user may search for the name, address, phone number, photo, and the like, of a counterpart user based on the registration information stored in the phone book to conveniently use the terminal.

However, in the related art, in order to store a photo in a photo field, the user must perform a complicated sequential process such as executing a phone book search menu, selecting the name of a phone book record or a phone number, selecting phone book editing, selecting a photo field, searching for a photo, and selecting a photo. Thus, in order to enhance user convenience, the process of storing a photo in the phone book of the mobile terminal needs to be reduced.

Also, it may happen that when the user searches for a photo stored in the photo field of the phone book, there is no photo of a particular person. Generally, a photo of a person stored in the phone book is provided from the corresponding person, or the user must request the person to provide his photo to directly add or update it. As a result, a temporal and spatial effort is required to acquire a photo from the counterpart, and when the user does not like a photo received from the counterpart, it is not easy for the user to receive it again.

SUMMARY OF THE INVENTION

Accordingly, one object of the present invention is to address the above-noted and other problems.

Another object of the present invention is to provide a mobile terminal capable of allowing a user to conveniently register and update a phone book photo, and a method for managing phone book data of the mobile terminal.

To achieve these and other advantages and in accordance with the purpose of the present invention, as embodied and broadly described herein, the present invention provides in one aspect a method for managing phone book data of a mobile terminal, including: displaying a phone book search screen; when photo storage is selected from the phone book search screen, comparing a file name of a photo to be stored with a record name of a phone book; and automatically designating a photo having the same file name as that of the record name of the phone booking a photo field of the phone book.

The photos may be stored by one or a plurality of record names in a memory and also designated in the photo field of each record.

In another aspect, the present invention provides a method for managing phone book data of a mobile terminal, including: displaying a phone book search screen; when a photo field of a particular user is selected from the phone book search screen, providing a menu option for requesting a photo from the corresponding user; requesting a phone book photo from the corresponding user according to the menu option; and automatically designating a phone book photo received from the user in a photo field of the phone book.

The menu option may be one of a video call, a message, a social network service (SNS) message, and an SNS.

The phone book search screen may include fields such as a user field, a photo field, a phone number field, an e-mail field, an address field, and the like.

When the menu option is a video call, the counterpart user may be requested to take a photo to request the phone book photo.

When the menu option is a message, a phone book photo request message may be transmitted through an SMS or an e-mail to request transmission of a phone book photo. The phone book photo request message may include an ID or a tag indicating a message requesting a phone book photo or an ID or a tag indicating a message requesting a photo including geographical information.

When the menu option is an SNS, a photo album of a counterpart user is connected to request a phone book photo addition approval to thereby request a phone book photo.

In another aspect, the present invention provides a method for managing phone book data of a mobile terminal, including: performing video call communication; capturing an image of a counterpart user during the video call communication; and when the video call communication is terminated, adding or updating an image selected by a user from among the captured images of the counterpart user as a phone book photo.

The image of the figure of the user may be captured when pre-set conditions like a particular pose or a particular figure of the user are detected.

In another aspect, the present invention provides a mobile terminal including: a memory configured to display a phone book search screen; a camera configured to capture a photo; an interface unit configured to receive a photo from an external source; and a controller configured to compare a photo received via the interface unit or a file name of a photo captured by the camera with a record name of the phone book and automatically designating a photo having the same file name as that of the record name of the phone book in a photo field of the phone book.

The photo is stored with one or a plurality of record names in the memory and, at the same time, designated in the photo field of each record.

The controller may recognize a face image from the received photo or the photo captured by the camera and store the recognized face image as photo field information of the phone book by a photo having the highest similarity among photos designated in the photo field of the phone book.

In another aspect, the present invention provides a mobile terminal including: a memory configured to store phone book information; a display unit configured to display a phone book search image; and a controller configured to request a phone book photo from a particular user according to a certain requesting method when a photo of the corresponding user is selected from the phone book search screen, and add or update a photo received from the particular user as a phone book photo.

The requesting method may include a video call, a message, and a social network service (SNS).

When the certain requesting method is a video call, the controller may request the counterpart user to take a photo, and when the certain requesting method is a message, the controller may transmit a phone book photo request message through an SMS or an e-mail to request a phone book photo.

The phone book photo request message may include an ID or a tag indicating a message requesting a phone book photo or an ID or a tag indicating a message requesting a photo including geographical information.

When the certain requesting method is an SNS, the controller accesses a photo album of the counterpart user to request a phone book photo addition approval to thereby request a phone book photo.

In another aspect, the present invention provides a mobile terminal including: a memory configured to store content of a video call; and a controller configured to capture an image of a counterpart user when pre-set conditions are met during the video call communication, and adding or updating an image selected by a user from among the captured images of the counterpart user, as a phone book photo.

The image of the figure of the user may be captured when pre-set conditions like a particular pose or a particular figure of the user are detected.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIGS. 15a to 15c illustrate an example of a method for requesting and storing a phone book photo using a video call;

DETAILED DESCRIPTION OF THE INVENTION

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself. Accordingly, the 'module' and 'part' may be mixedly used.

Mobile terminals may be implemented in various forms. For example, the terminal described in the present invention may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, it would be understood by a person in the art that the configuration according to the embodiments of the present invention can be also applicable to the fixed types of terminals, except for any elements especially configured for a mobile purpose.

Figure 1:
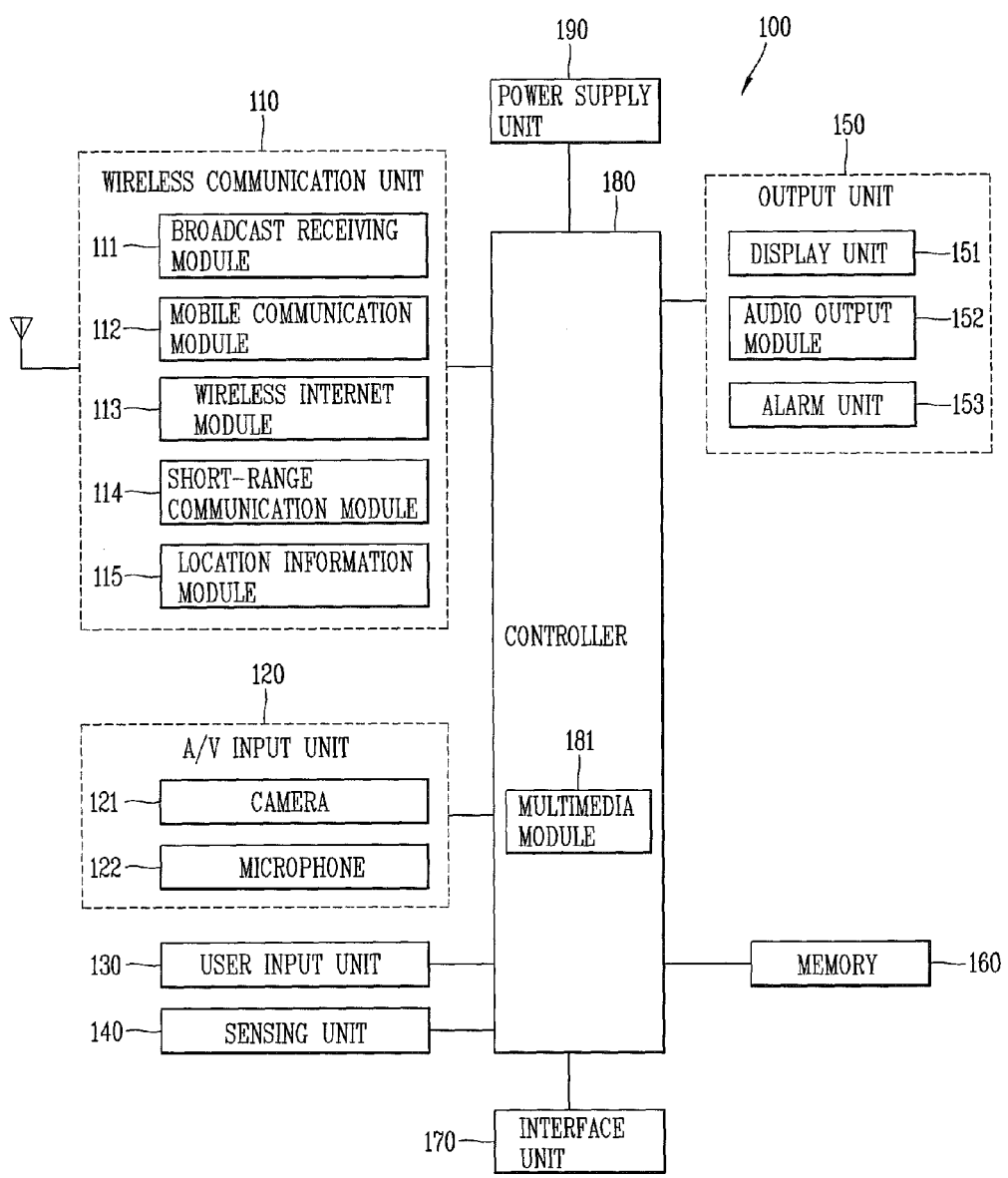
FIG. 1 is a schematic block diagram of a mobile terminal implementing an embodiment of the present invention.

FIG. 1 is a block diagram of a mobile terminal according to an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. FIG. 1 shows the mobile terminal as having various components, but it should be understood that implementing all of the illustrated components is not a requirement. Greater or fewer components may alternatively be implemented.

The elements of the mobile terminal will be described in detail as follows.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals broadcast by using various types of broadcast systems. In particular, the broadcast receiving module 111 may receive a digital broadcast by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), etc. The broadcast receiving module 111 may be configured to be suitable for every broadcast system that provides a broadcast signal as well as the above-mentioned digital broadcast systems.

Broadcast signals and/or broadcast-associated information received via the broadcast receiving module 111 may be stored in the memory 160 (or anther type of storage medium).

The mobile communication module 112 transmits and/or receives radio signals to and/or from at least one of a base station (e.g., access point, Node B, etc.), an external terminal (e.g., other user devices) and a server (or other network entities). Such radio signals may include a voice call signal, a video call signal or various types of data according to text and/or multimedia message transmission and/or reception.

The wireless Internet module 113 supports wireless Internet access for the mobile terminal. This module may be internally or externally coupled to the terminal. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal. A typical example of the location information module is a GPS (Global Positioning System). According to the current technology, the GPS module 115 calculates distance information from three or more satellites and accurate time information and applies trigonometry to the calculated information to thereby accurately calculate three-dimensional current location information according to latitude, longitude, and altitude. Currently, a method for calculating location and time information by using three satellites and correcting an error of the calculated location and time information by using another one satellite. In addition, the GPS module 115 can calculate speed information by continuously calculating the current location in real time.

The A/V input unit 120 is configured to receive an audio or video signal. The A/V input unit 120 may include a camera 121 (or other image capture device) and a microphone 122 (or other sound pick-up device). The camera 121 processes image data of still pictures or video obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like. In particular, when the touch pad is overlaid on the display unit 151 in a layered manner, it may form a touch screen.

The sensing unit 140 (or other detection means) detects a current status (or state) of the mobile terminal 100 such as an opened or closed state of the mobile terminal 100, a location of the mobile terminal 100, the presence or absence of user contact with the mobile terminal 100 (i.e., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141. This will be described in relation to a touch screen later.

The interface unit 170 (or other connection means) serves as an interface by which at least one external device may be connected with the mobile terminal 100. For example, the external devices may include wired or wireless headset ports, an external power supply (or battery charger) ports, wired or wireless data ports, memory card ports, ports for connecting a device having an identification module, audio input/output (I/O) ports, video I/O ports, earphone ports, or the like.

The identification module may be a memory chip (or other element with memory or storage capabilities) that stores various information for authenticating user's authority for using the mobile terminal 100 and may include a user identity module (UIM), a subscriber identity module (SIM) a universal subscriber identity module (USIM), and the like. In addition, the device having the identification module (referred to as the 'identifying device', hereinafter) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

Meanwhile, when the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of them may be configured to be transparent to allow viewing of the exterior, which may be called transparent displays. A typical transparent display may be, for example, a TOLED (Transparent Organic Light Emitting Diode) display, or the like. The mobile terminal 100 may include two or more display units (or other display means) according to its particular desired embodiment. For example, the mobile terminal may include both an external display unit (not shown) and an internal display unit (not shown). The touch screen may be configured to detect even a touch input pressure as well as a touch input position and a touch input area.

A proximity sensor 141 may be disposed within or near the touch screen. The proximity sensor 141 is a sensor for detecting the presence or absence of an object relative to a certain detection surface or an object that exists nearby by using the force of electromagnetism or infrared rays without a physical contact. Thus, the proximity sensor 141 has a considerably longer life span compared with a contact type sensor, and it can be utilized for various purposes.

Examples of the proximity sensor 141 may include a transmission type photoelectric sensor, a direct reflection type photoelectric sensor, a mirror-reflection type photo sensor, an RF oscillation type proximity sensor, a capacitance type proximity sensor, a magnetic proximity sensor, an infrared proximity sensor, and the like.

The operational principle of the RF oscillation type proximity sensor, among the implementable proximity sensors, will be described as an example. When an object approaches the sensor detection surface in a state that an RF (Radio Frequency) of a static wave is oscillated by an oscillation circuit, the oscillation amplitude of the oscillation circuit is attenuated or stopped, and such a change is converted into an electrical signal to detect the presence or absence of an object. Thus, even if any material other than metallic one is positioned between the RF oscillation proximity sensor and the object, a proximity switch can detect the object intended to be detected without an interference by the object.

Without the proximity sensor 141, if the touch screen is an electrostatic type, the approach of a pointer (stylus) can be detected based on a change in a field according to the approach of the pointer.

Thus, although the pointer is not actually brought into contact with the touch screen but merely positioned close to the touch screen, the position of the pointer and the distance between the pointer and the touch screen can be detected. In the following description, for the sake of brevity, recognition of the pointer positioned to be close to the touch screen will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

By employing the proximity sensor 141, a proximity touch and a proximity touch pattern (e.g., a proximity touch distance, a proximity touch speed, a proximity touch time, a proximity touch position, a proximity touch movement state, or the like) can be detected, and information corresponding to the detected proximity touch operation and the proximity touch pattern can be outputted to the touch screen.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer, or other sound generating device.

The alarm unit 153 (or other type of user notification means) may provide outputs to inform about the occurrence of an event of the mobile terminal 100. Typical events may include call reception, message reception, key signal inputs, a touch input etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (i.e., vibrations) to inform the user thereof. By providing such tactile outputs, the user can recognize the occurrence of various events even if his mobile phone is in the user's pocket. Outputs informing about the occurrence of an event may be also provided via the display unit 151 or the audio output module 152.

The memory 160 (or other storage means) may store software programs or the like used for the processing and controlling operations performed by the controller 180, or may temporarily store data (e.g., a phonebook, messages, still images, video, etc.) that have been outputted or which are to be outputted. Also, the memory 160 may store data regarding various patterns of vibrations and audio signals outputted when a touch is applied to the touch screen.

The memory 160 may include at least one type of storage medium including a Flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, an optical disk, and the like. Also, the mobile terminal 100 may cooperate with a network storage device that performs the storage function of the memory 160 over a network connection.

The controller 180 (such as a microprocessor or the like) typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separate from the controller 180.

The controller 180 may perform a pattern recognition processing to recognize a handwriting input or a picture drawing input performed on the touch screen as characters or images.

The power supply unit 190 receives external power (via a power cable connection) or internal power (via a battery of the mobile terminal) and supplies appropriate power required for operating respective elements and components under the control of the controller 180.

Various embodiments as described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, external elements of the mobile terminal will be described from the perspective of their functions with reference to FIGS. 2 and 3. The mobile terminal may be implemented in a variety of different configurations. Examples of such configurations include folder-type, bar-type, swing-type, a slide type, as well as various other configurations. The following description will primarily relate to a slide-type mobile terminal. However, such description can equally apply to other types of mobile terminals.

Figure 2:
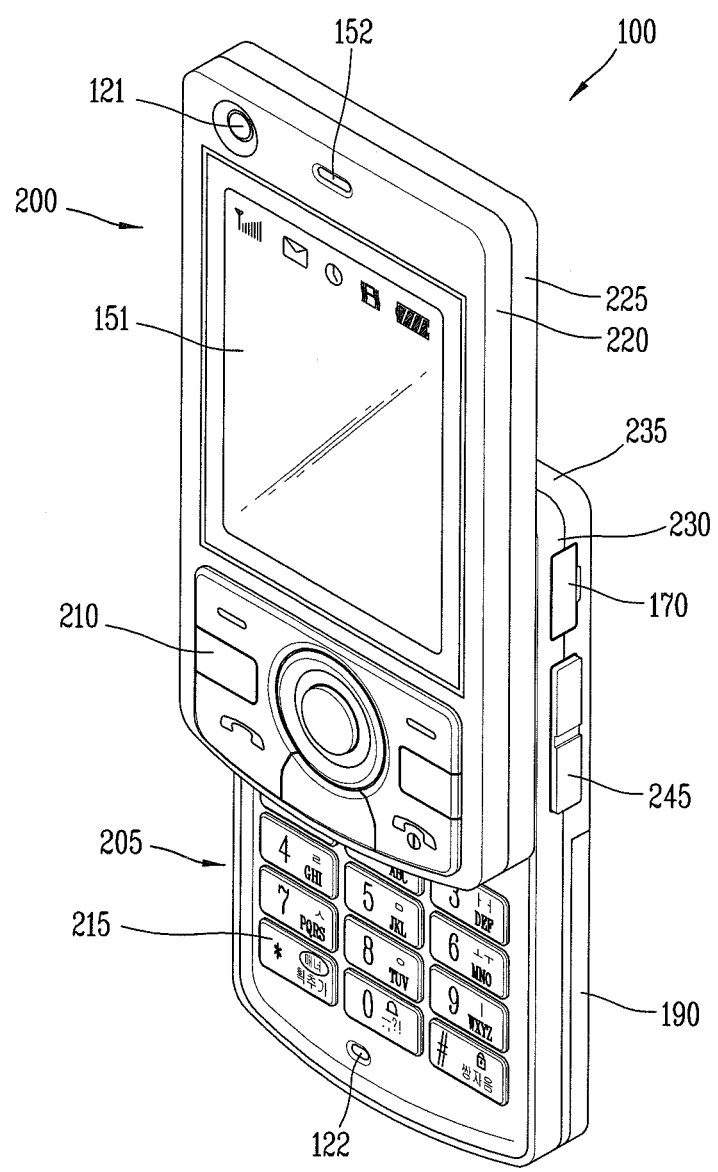
FIG. 2 is a front perspective view of a mobile terminal implementing an embodiment of the present invention.

FIG. 2 is a front perspective view of the mobile terminal according to an exemplary embodiment of the present invention.

The mobile terminal 100 according to the present invention includes a first body 200, and a second body 205 that can be slidably moved along at least one direction with respect to the first body 200. In case of a folder type mobile phone, the mobile terminal 100 may include a first body and a second body having one side that can be folded or unfolded with respect to the first body.

A state in which the first body 200 is disposed to overlap with the second body 205 may be called a closed configuration, and as shown in FIG. 2, a state in which at least a portion of the second body 205 is exposed may be called an open configuration.

Although not shown, the mobile terminal according to the present invention may be a folder type mobile terminal including a first body and a second body having one side to be folded or unfolded with respect to the first body. Here, a state in which the second body is folded may be called a closed configuration, and a state in which the second body is unfolded may be called an open configuration.

In addition, although not shown, the mobile terminal according to the present invention may be a swing type mobile terminal including a first body and a second body configured to be swingable with respect to the first body. Here, a state in which the first body is disposed to overlap with the second body may be called a closed configuration, and a state in which the second body is swung to expose a portion of the first body may be called an open configuration.

The folder type mobile terminal and the swing type mobile terminal can be easily known by the skilled person in the art without any explanation, so its detailed description will be omitted.

In the closed configuration, the mobile terminal 100 mainly operates in a standby (or idle) mode, and the standby mode may be released upon user manipulation. The mobile terminal operates mainly in the calling mode or the like in the open configuration, and it can be changed to the standby mode with the lapse of time or upon user manipulation.

The case (or casing, housing, cover, etc.) constituting the external appearance of the first body 200 may include a first front case 220 and a first rear case 225. Various electronic components are installed in the space between the first front case 220 and the first rear case 225. One or more intermediate cases may be additionally disposed between the first front case 220 and the first rear case 225.

The cases may be formed by injection-molding a synthetic resin or may be made of a metallic material such as stainless steel (STS) or titanium (Ti), etc.

The display unit 151, the audio output module 152, the camera 121 or the first user input unit 210 may be located at the first body 200, specifically, on the first front case 220 of the first body 200.

The display unit 151 has been described in relation to FIG. 1, so its detailed description will be omitted for the sake of brevity.

The audio output unit 152 may be implemented in the form of a speaker or other sound producing device.

The camera 121 may be implemented to be suitable for capturing images or video with respect to the user and other objects.

Like the first body 200, the case constituting the external appearance of the second body 205 may include a second front case 230 and a second rear case 235.

A second user input unit 215 may be disposed at the second body, specifically, at a front face of the second body 205.

A third user input unit 245, the microphone 122, and the interface unit 170 may be disposed on at least one of the second front case 230 and the second rear case 235.

The first to third user input units 210, 215 and 245 may be generally referred to as a manipulating portion 130, and various methods and techniques can be employed for the manipulation unit so long as they can be operated by the user in a tactile manner.

For example, the user input units 130 can be implemented as dome switches, actuators, or touch pad regions that can receive user commands or information according to the user's touch operations (e.g., pressing, pushing, swiping, drag-and-drop, etc.) or may be implemented in the form of a rotatable control wheel (or disc), keys or buttons, a jog dial, a joystick, or the like.

In terms of their functions, the first user input unit 210 is used for inputting (entering) commands such as start, end, scroll or the like, and the second user input unit 215 is used for inputting (entering) numbers, characters, symbols, or the like. The first user input unit 210 may include a soft key used by interworking with icons displayed on the display unit 151 and navigation key (largely including four direction keys and a central key) for indicating and checking directions.

Also, the third user input unit 245 may support the so-called hot key functions that allow more convenient activation of particular functions for the mobile terminal.

The microphone 122 (or other sound pick-up device) may be appropriately implemented to detect user voice inputs, other sounds, and the like.

The interface unit 170 may be used as a communication link (or passage, path, etc.) through which the terminal can exchange data or the like with an external device. The interface unit 170 has been described in relation to FIG. 1, so its detailed description will be omitted.

The power supply unit 190 for supplying power to the terminal may be located at the second rear case 235.

The power supply unit 190 may be, for example, a rechargeable battery that can be detached.

Figure 3:
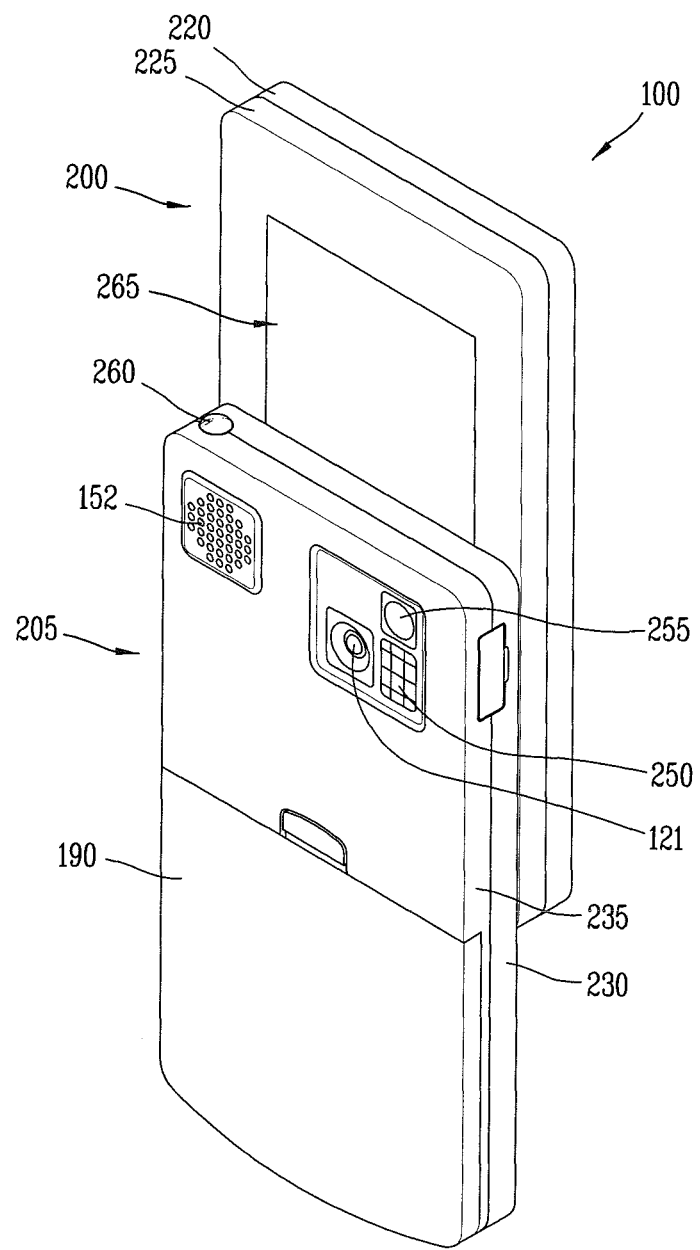
FIG. 3 is a rear perspective view of a mobile terminal implementing an embodiment of the present invention.

FIG. 3 is a rear perspective view of the mobile terminal of FIG. 2 according to an exemplary embodiment.

As shown in FIG. 3, a camera 121 (or other image pick-up device) may additionally be disposed on a rear surface of the second rear case 235 of the second body 205. The camera 121 of the second body 205 may have an image capture direction which is substantially opposite to that of the camera 121 of the first body 200 (namely, the two cameras may be implemented to face towards opposing directions, such as front and rear), and may support a different number of pixels (i.e., have a different resolution) than the camera 121 of the first body.

For example, the camera 121 of the first body 200 may operate with a relatively lower resolution to capture an image(s) of the user's face and immediately transmit such image(s) to another party in real-time during video call communication or the like in which reverse link bandwidth capabilities may be limited. Also, the camera of the second body 205 may operate with a relatively higher resolution to capture images of general objects with high picture quality, which may not require immediately transmission in real-time, but may be stored for later viewing or use.

Additional camera related components, such as a flash 250 and a mirror 255, may be additionally disposed adjacent to the camera 121. When an image of the subject is captured with the camera 121 of the second body 205, the flash 250 illuminates the subject. The mirror 255 allows the user to see himself when he wants to capture his own image (i.e., self-image capturing) by using the camera 121 of the second body 205.

The second rear case 235 may further include an audio output module 152.

The audio output module 152 of the second body 205 may support stereophonic sound functions in conjunction with the audio output module 152 of the first body 200 and may be also used for sending and receiving calls in a speaker phone mode.

A broadcast signal receiving antenna 260 may be disposed (externally or internally) at one side or region of the second rear case 235, in addition to an antenna that is used for mobile communications. The antenna 260 can also be configured to be retractable from the second body 205.

One part of a slide module 265 that allows the first body 200 and the second body 205 to slide relative to each other may be disposed on the first rear case 225 of the first body 200.

The other part of the slide module 265 may be disposed on the second front case 230 of the second body 205, which may not be exposed as shown in the drawing.

The second camera 121 and other components may be disposed on the second body 205, but such configuration is not meant to be limited.

For example, one or more of the elements (e.g., 260, 121 and 250 and 152 etc.), which are disposed on the second rear case 235 may be mounted on the first body 200, mainly, on the first rear case 225. In this case, those elements disposed on the first rear case 225 can be protected (or covered) by the second body 205 in the closed configuration. In addition, even if a separate camera is not provided at the second body, the camera module 121 may be configured to rotate (or otherwise be moved) to thus allow image capturing in various directions.

The mobile terminal 100 as shown in FIGS. 1 to 3 may be configured to operate with a communication system, which transmits data via frames or packets, such as wired and wireless communication systems, as well as satellite-based communication systems.

Such communication systems in which the mobile terminal according to the present invention can operate will now be described with reference to FIG. 4.

Such communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS) (in particular, long term evolution (LTE)), global system for mobile communications (GSM), and the like. As a non-limiting example, the description hereafter relates to a CDMA communication system, but such teachings apply equally to other types of systems.

Figure 4:
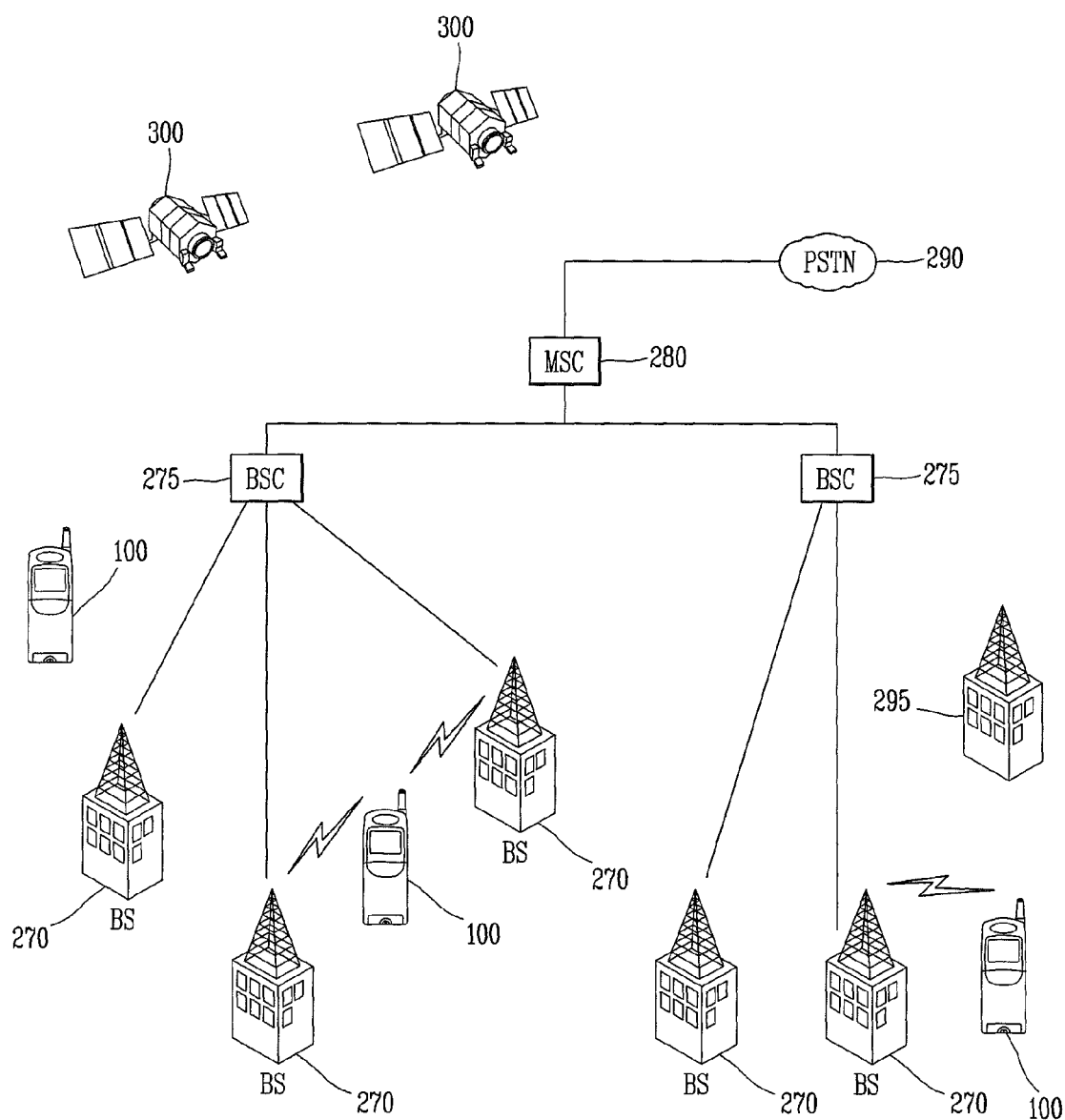
FIG. 4 is a block diagram of a wireless communication system with which the mobile terminal according to an embodiment of the present invention is operable.

Referring to FIG. 4, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 4 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 4, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295. In FIG. 4, several global positioning systems (GPS) satellites 300 are shown. The satellites 300 help locate at least one of a plurality of terminals 100. In FIG. 4, several satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270. The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

A phone book of a mobile terminal stores the name, a phone number, an address, an e-mail address, and other information regarding people (i.e., counterpart users) with which a user makes call communication or to and from which the user transmits and receives an e-mail. Thus, the user can conveniently transmit and receive voice, an image, an e-mail, and the like, to and from the counterpart user by using the data stored in the phone book.

Various data stored in the phone book is managed in the form of a database, and the information regarding the counterpart users may be managed individually or by particular groups (e.g., friend, co-worker, family member, relative, or the like).

Thus, the present invention proposes a method for effectively registering or storing data to or in the phone book, and updating the registered or stored data.

Figure 5:
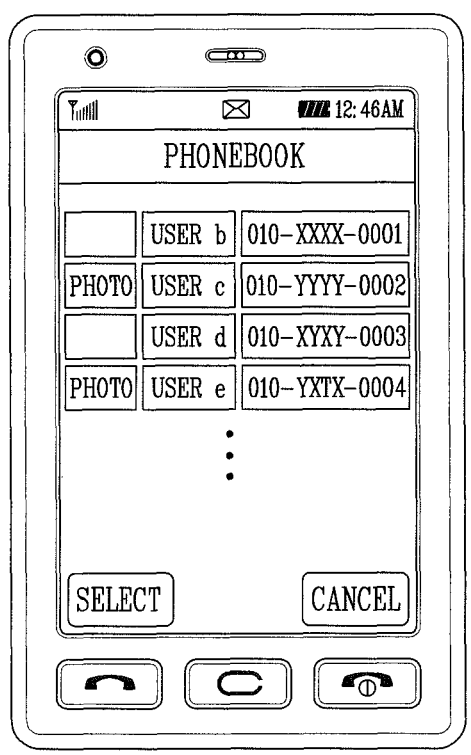
FIG. 5 illustrates a general data list display form of a phone book.

FIG. 5 illustrates a general data list display form of a phone book.

As shown in FIG. 5, the data of the phone book has a structure of a record and a field.

The record is a data list of users, which is inputted by the user and stored in the memory 160. One record includes a plurality of fields, for example, a photo field, a name field, and an address field (phone number or e-mail), and photos, names, phone numbers (or e-mail addresses) of one or more users are registered in each field.

The record (the list of phone book data) may be displayed in a horizontal form or in a vertical form, and in the present invention, a data list is displayed in a horizontal form for the sake of brevity.

When the user executes the phone book menu, the controller 180 displays the data list on the display unit 151. Accordingly, the user may perform communication (e.g., voice call communication, video call communication, an e-mail transmission, and the like) by using data of a desired field on the corresponding data list, or may conveniently perform data management related to adding or updating of corresponding data.

Figure 6:
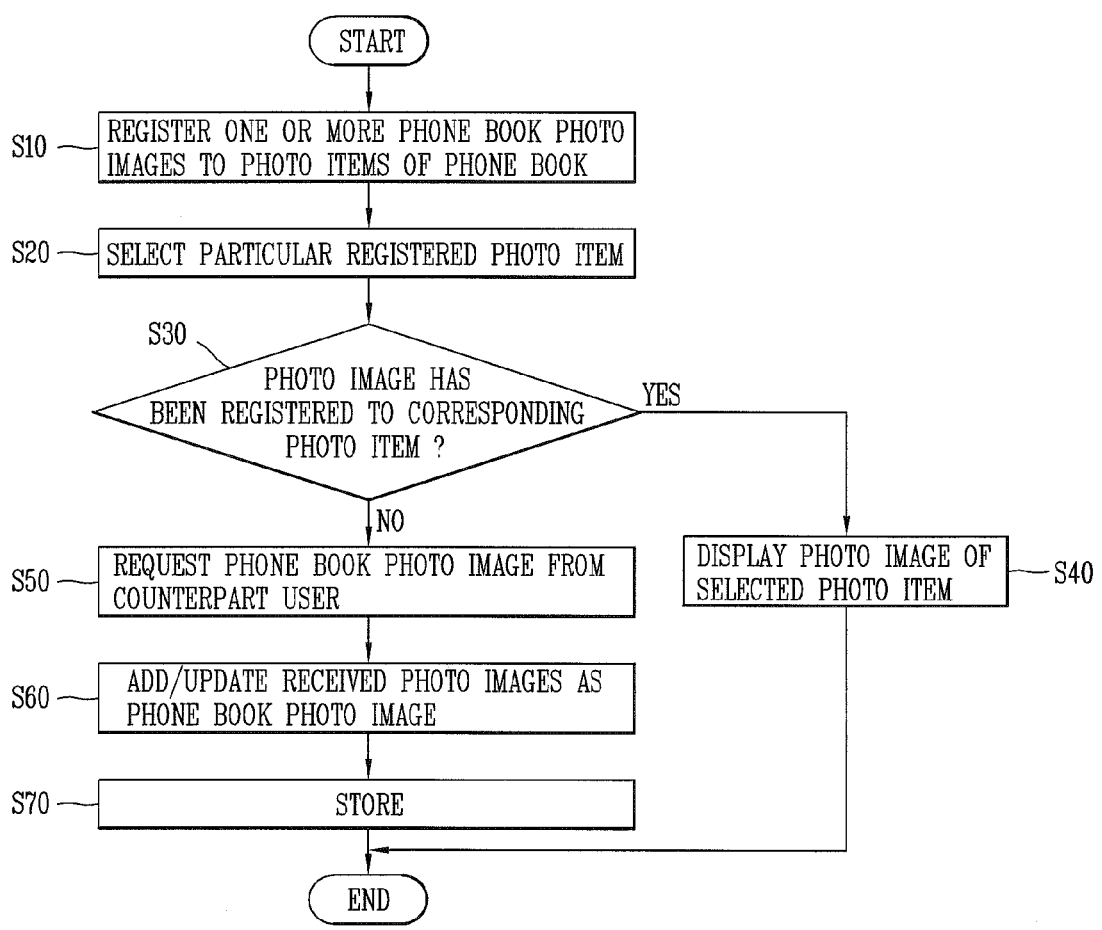
FIG. 6 is a flow chart illustrating the process of a method for managing phone book data according to an exemplary embodiment of the present invention.

FIG. 6 is a flow chart illustrating the process of a method for managing phone book data according to an exemplary embodiment of the present invention.

As shown in FIG. 6, in an exemplary embodiment of the present invention, one or more photos may be registered to the photo item of the phone book (S10). The photo registration may be made as the user stores a photo of himself or a photo of a particular user in the photo field (or the photo item) of the phone book. The storing of the photo will be described later.

The data list of the phone book is added whenever the user perform call communication with a counterpart user or whenever the user transmits and receives an e-mail to and from the counterpart user. The photo of the counterpart user may be provided by the counterpart user or may be substituted by a symbol (or avatar) that can discriminate the counterpart user.

Thereafter, when the user executes the phone book menu, the controller 180 displays a data list (record). The user may select a desired user from the data list to perform communication (e.g., voice call communication, video call communication, an e-mail transmission, and the like), or select a photo of a particular user from the photo field to add or update the photo.

If the user selects the photo field (photo item) of a particular user registered to the phone book through a touch/proximity input or a keypad input (S20), the controller 180 checks whether or not the current photo has been registered to the corresponding photo item (S30). When the current photo has been registered to the corresponding photo item, the controller 180 magnifies the photo of the selected user and displays it on the display unit 151 (S40). If the current photo has not been registered, the controller 180 provides a menu option allowing the user to register the photo of the corresponding user.

In this case, when the photo of the selected user is magnified and displayed on the display unit 151, a 'deletion' or 'updating' menu of the corresponding photo is also displayed together, so that the user can replace it with a different desired photo. In particular, when the user selects the updating menu, the controller 180 may display an updating method, for example, a photo capturing, the use of a stored photo, and other available items.

When the photo of the selected user has not been registered, a displayed menu option includes a search menu for searching whether or not the corresponding photo has been stored in an area and a selection menu for selecting a particular photo.

Also, in an exemplary embodiment of the present invention, when a user whose photo has not been registered is a counterpart user, a menu option for requesting a photo from the counterpart user is provided.

Namely, when a photo of the particular counterpart user has not been currently registered to the phone book or when the photo of the user has not been stored in the memory, the controller 180 requests transmission of a photo from the counterpart user according to a user request (S50), and when a photo is received from the counter part user, the controller 180 registers the photo of the corresponding counterpart user in the photo field of the phone book (S60 and S70). In this case, the controller 180 provides a menu for selecting a message for inducing a request for a photo of the corresponding user and a communication means for actually requesting a photo.

In particular, when the user selects the 'updating' menu in step S40, the controller 180 executes the operation of step S50 to update the currently registered photo with the photo which has been transmitted from the counterpart user.

In this manner, in the present invention, photos of one or more users can be stored in (or registered to) the phone book separately or collectively by using the photo information currently stored in the mobile terminal or the photo information transmitted fro the counterpart.

The operation of each step will now be described in more detail.

Figure 7:
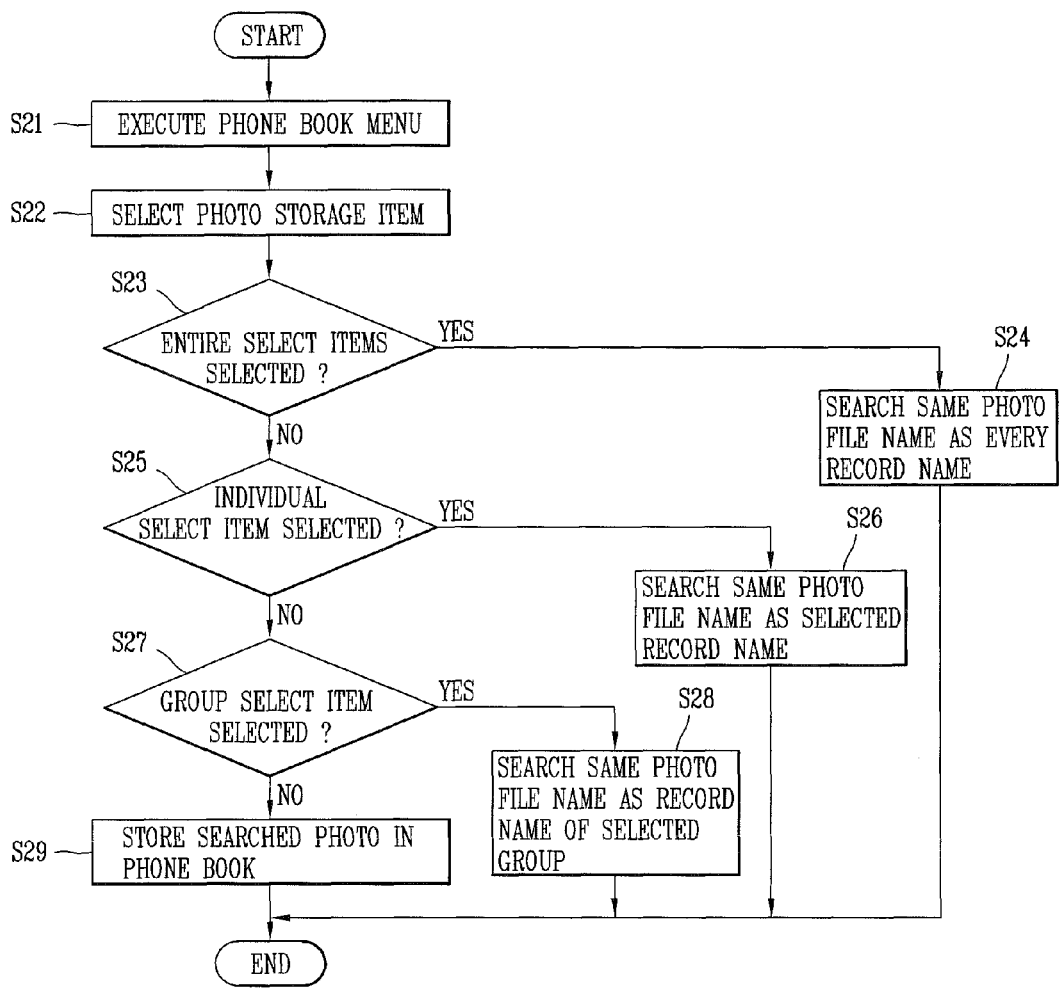
FIG. 7 is a flow chart illustrating the process of a method for storing a phone book photo using a phone book storage option.

FIG. 7 is a flow chart illustrating the process of a method for storing a phone book photo using a phone book storage option.

With reference to FIG. 7, when the user executes a phone book menu according to a guidance of a user interface displayed on the display unit 151 of the mobile terminal 100 (S21), the controller 180 displays one or more data lists, namely, a plurality of records, on the display unit 151. The records may be displayed by the users or by the user groups.

After the phone book menu is executed, when the user selects a photo storage menu through a touch/proximity input or a keypad input (S22), the controller 180 displays a sub-menu including photo storage option items, namely, an 'entire selection', an 'individual selection', and a 'group selection', on the display unit 151.

When the user selects the 'entire selection' item from among the displayed photo storage option items (S23), the controller 180 searches the memory 160 for the same photo file name as all the record names (i.e., the names stored in the name field of the records) within the phone book (S24).

The controller 180 automatically stores access path information of all the photo files having the same file name as the phone book record name in the photo field of the phone book record identical to the photo file name (S29).

Accordingly, when the user selects the 'entire selection' item from the photo storage menu, the photo of the user having the same file name as that of the phone book record name can be automatically stored in or registered to the phone book.

When the user selects the 'individual selection' item from among the displayed photo storage option items (S25), the controller 180 displays a phone book search screen on the display module 151 to induce the user to search the phone book. When the user selects a particular phone book record name from the displayed phone book search screen, the controller 180 searches the memory 160 for the same photo file name as the selected record name (S26). In this state, the controller 180 displays a message inquiring whether the user wants to select additionally on the display module 151. When the user selects additional selection, the controller 180 displays the phone book search screen and performs step S26.

Thereafter, when the user does not make additional selection any further, the controller 180 automatically stores the access path information of all the photo files having the same file name as the record name of the selected phone book in the photo field of the corresponding phone book record (S29). Accordingly, the user can simultaneously store a photo in one or more records existing in the phone book.

In this case, when the same photo file name as the selected record name is not searched from the memory 160, the user may be induced to request a photo transmission as illustrated in FIGS. 13*b* and 13*c*.

Meanwhile, when the user selects the 'group selection' item from among the displayed photo storage option items (S26), the controller 180 displays a phone book search screen on the display module 151 to induce phone book searching, and when the user selects a particular phone book group from the corresponding phone book search screen, the controller 180 searches the memory 160 for the same photo file names as all the record names in the selected phone book group (S28).

Subsequently, the controller 180 automatically stores access path information of all the photo files having the same file name as the record names of the phone book group selected by the user in the photo field of the record of the corresponding phone book group (S29). Accordingly, when the user selects the 'group selection' from the photo storage menu, the photo can be automatically stored by the phone book group Besides the foregoing method, the user may capture a photo by using the mobile terminal 100 and automatically store (register) the photo in the phone book or may automatically store photos which have been received from an external device (computer) in the phone book. The method for registering phone book data will now be described.

Figure 8:
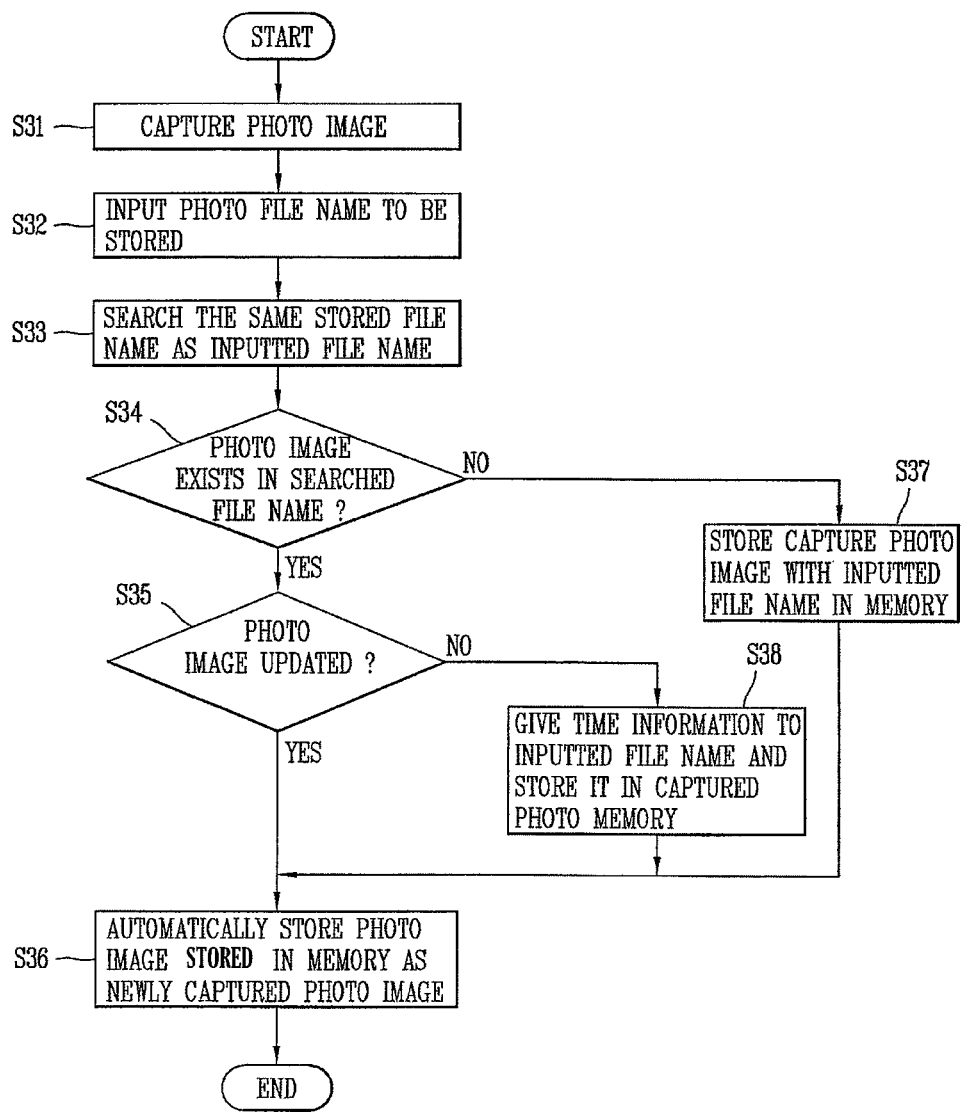
FIG. 8 is a flow chart illustrating the process of a method for storing a phone book photo using a capture photo.

FIG. 8 is a flow chart illustrating the process of a method for storing a phone book photo using a capture photo.

As shown in FIG. 8, when the user captures a photo by using the mobile terminal 100, the controller 180 displays a message inquiring whether to store the capture photo on the display module 151 (S31).

When the user selects photo storage through a touch/proximity input or a key input and inputs a file name for storing the photo (S32), the controller 180 searches whether or not the same file name as the photo file name inputted by the user exists in the memory 160 (S33).

When the same file name as the inputted photo file name exists, the controller 180 performs different storing operations according to whether or not there is a photo in the searched file name (S34).

When a photo has been stored in the searched file name, the controller 180 displays a message inquiring about whether or not the user wants to update the photo on the display module 151 (S35). When the user selects photo updating, the controller 180 replaces the photo of the same file name stored in the memory 160 with the newly captured photo and stores it, and automatically stores access path information of the photo file in the photo field of the phone book record having the same record name as the photo file name (S36).

Meanwhile, if there is no photo in the searched file name, the controller 180 stores the newly captured photo in a file name inputted by the user in the memory 160 and, at the same time, automatically stores access path information of the photo file in the photo field of the phone book record having the same record name as the photo file name (S37).

When the user does not select photo updating in step S35, the controller 180 stores the newly captured photo in a file name inputted by the user, to which a storage date or a capture data has been given, in the memory 160 and automatically store access path information of the photo file in the photo field of the phone book record having the same record name as the photo file name inputted by the user (S38).

Figure 9:
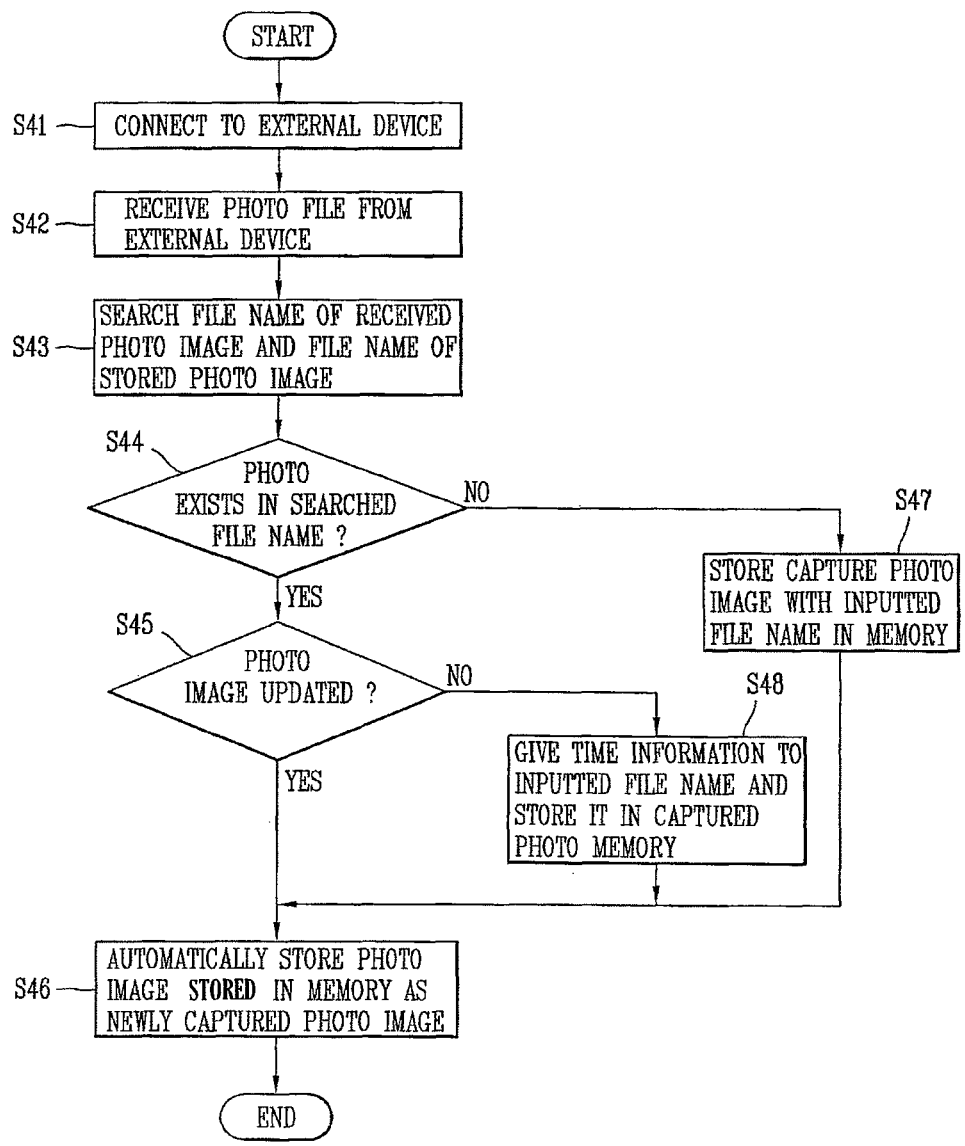
FIG. 9 is a flow chart illustrating the process of a method for storing a phone book photo using a photo received from an external device.

FIG. 9 is a flow chart illustrating the process of a method for storing a phone book photo using a photo received from an external device.

In the present invention, it is assumed that the external device is a personal computer (PC). In this case, for data communication between the computer and the mobile terminal 100, a synchronization program, which automatically recognizes a connection with the mobile terminal 100 and allows for data communication, must be stored in the computer.

The user may connect the mobile terminal 100 to the computer through a wireline/wireless interface and then transmit data stored in the PC to the mobile terminal 100 (S41). The data includes one or more photos.

When data is received from the computer through the interface unit 170 (S42), the controller 180 discriminates the photo among the data and searches the file name of the corresponding photo and file names of the photos stored in the memory 160 (S43).

When it is determined that the same photo file name as the file name of the received photo is stored in the memory 160, the controller 180 checks whether the current photo has been stored in the stored file name (S44). As described above with reference to FIG. 8, the controller 180 performs different storing operations according to whether or not a photo exists in the searched photo file name.

If there exists a photo in the previously stored file name, the controller 180 displays a message inquiring of the user about whether to update the photo on the display module 151 (S45). In this case, when the user selects photo updating, the controller 180 replaces the photo of the same file name stored in the memory 160 with he photo received from the computer and stores the same, and at the same time, the controller automatically stores access path information of the photo file in the photo field of the phone book record having the same record name as the photo file name (S46).

Meanwhile, when there is no photo in the searched file name, the controller 180 stores the photo, which has been received from the computer, in the same file name in the memory 160, and at the same time, the controller 180 automatically stores access path information of the photo file in the photo field of the phone book record having the same record name as the photo file name (S47).

Also, when the user does not select photo updating in step S35, the controller 180 stores the corresponding photo in a file name, to which at least one of a storage date, a reception date, a capture date has been given to a file name received from the computer, in the memory 160, and automatically stores access path information of the photo file in the photo field of the phone book record having the same record name as the received file name (S48).

Meanwhile, a face recognition program for recognizing a face from a newly captured photo or from a stored photo and comparing it with different photo to analyze whether or not they are similar to each other, may be stored in the memory 160. When capturing of a photo is performed according to a user selection, the controller 180 executes the face recognition program and automatically register and update a phone book photo base don the face recognition result. An example of the method of registering and updating a phone book photo using a face recognition is illustrated in FIGS. 10 to 12.

Figure 10:
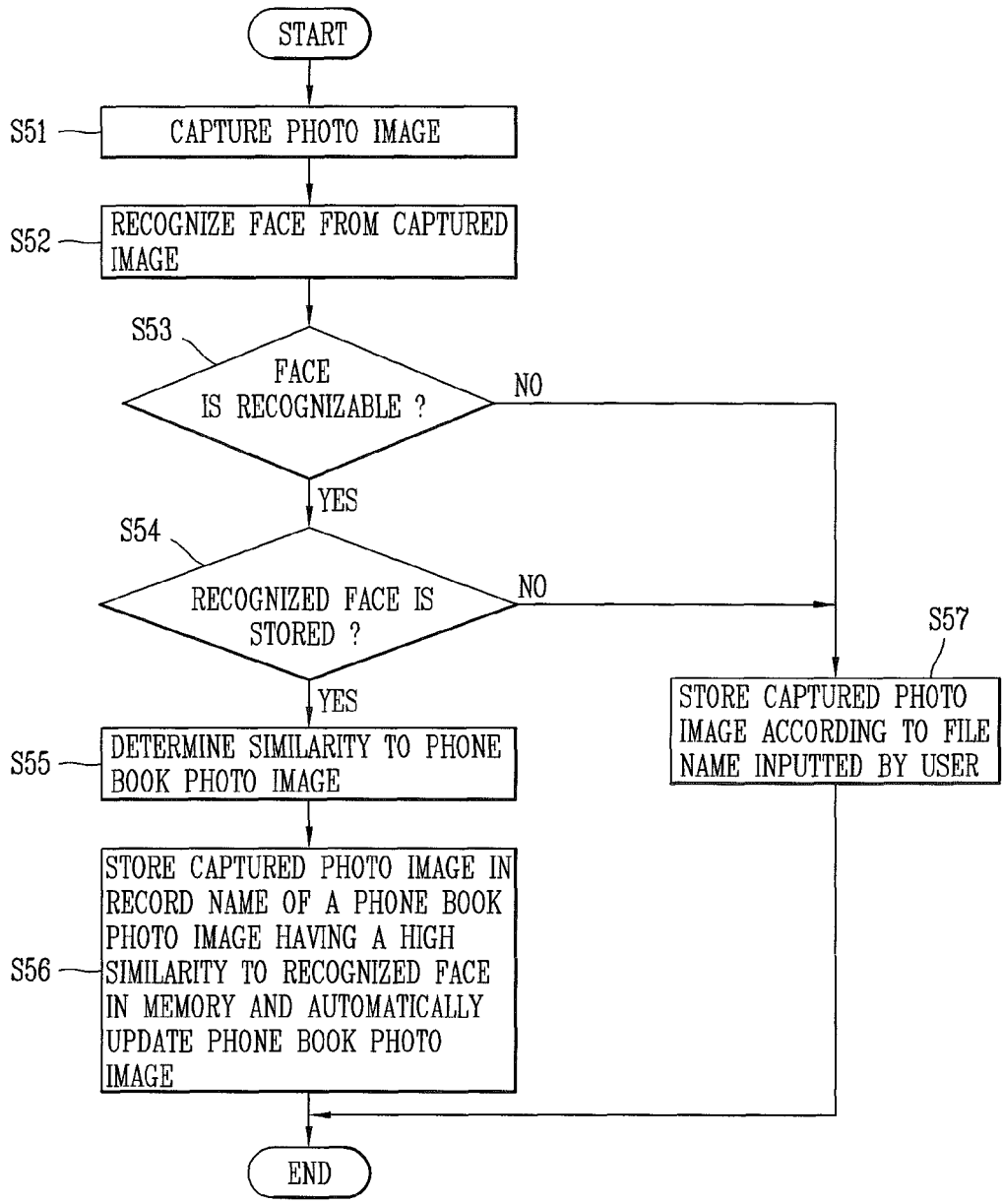
FIG. 10 is a flow chart illustrating the process of a method for storing a phone book photo using a face recognition.
Figure 11:
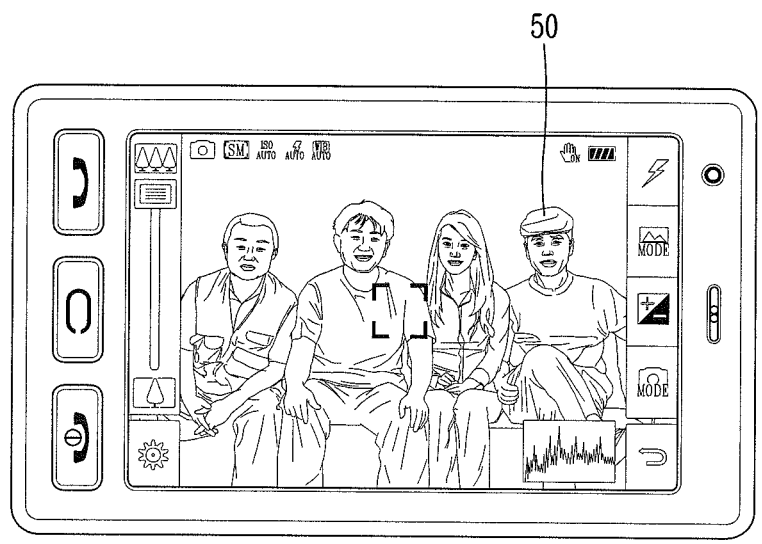
FIG. 11 illustrates an example of recognizing a face from a captured photo.
Figure 12:
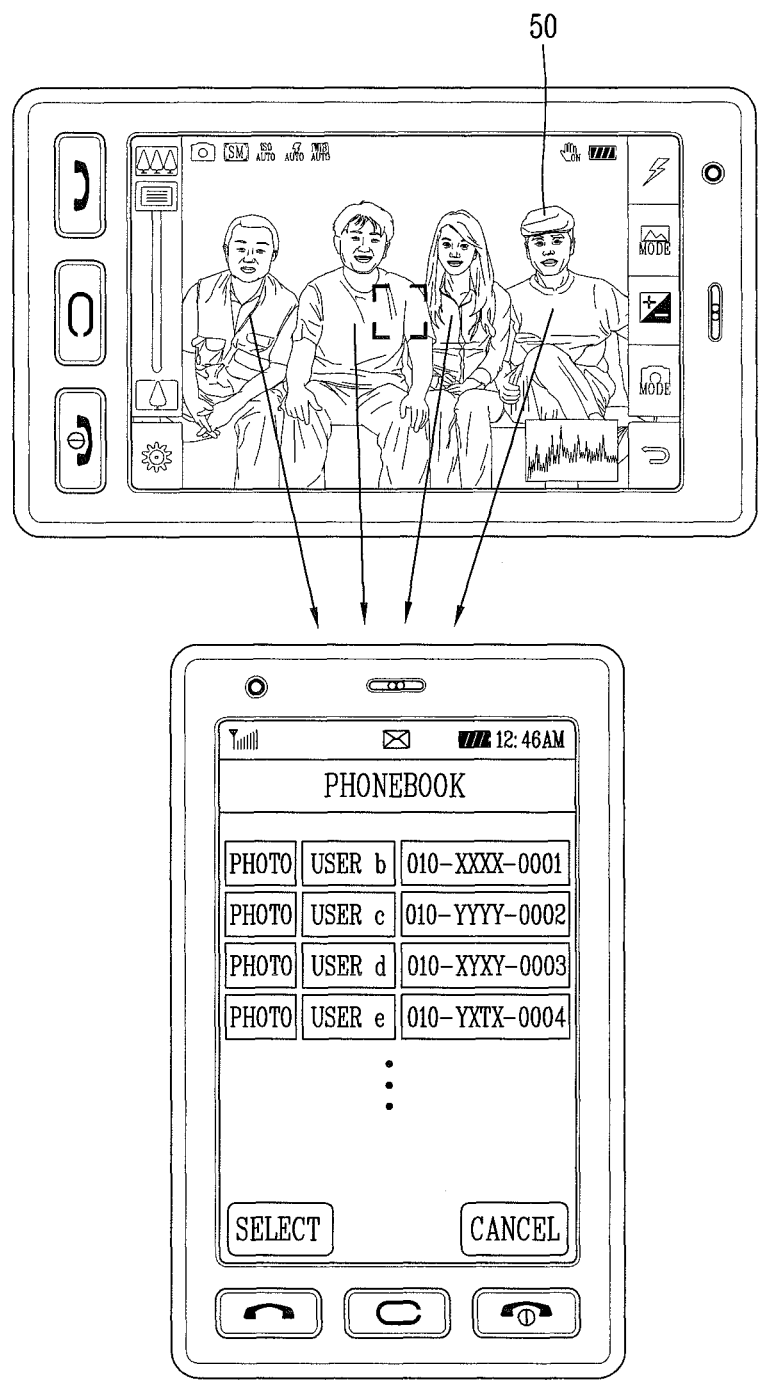
FIG. 12 illustrates an example of storing the recognized face image in a photo field of a phone book.

FIG. 10 is a flow chart illustrating the process of a method for storing a phone book photo using a face recognition, and FIG. 11 illustrates an example of recognizing a face from a captured photo.

With reference to FIGS. 10 and 11, when the user performs image capturing by using the mobile terminal 100 (S51), the controller 180 executes the face recognition program to check whether or not a face can be recognized from the capture photo (S52, S53). Upon checking, when a face can be recognized, a face recognition area 50 of the photo is recognized to recognize the face of one or more users. The face recognition area 50 is selectively displayed according to a user's menu selection, and after the face recognition area 50 is displayed, the face recognition area 50 may disappear with the lapse of a certain time.

When a face of the captured image is recognized, the controller 180 displays a message inquiring whether to store the recognized face(s) on the display module 151 (S54). When the user selects storing of the recognized face, the controller 180 recognizes the faces of the photos stored in the memory 160 and compares the faces of the stored photos and the faces recognized in the captured photo to determine a similarity degree of them (S55). In this case, when a similarity degree between the recognized face and the photo stored in the memory 160 is higher than a certain threshold value, the controller 180 determines that the similarity degree is high.

If a photo having a high similarity to the recognized face among the photos designated in the photo field of the phone book is searched, the controller 180 automatically stores the recognized face in a corresponding record name of the phone book in the memory 160 (S56). At the same time, as shown in FIG. 12, the controller 180 automatically updates the photo designated in the photo field of the corresponding record of the phone book with the recognized face photo (S56).

Also, without being limited thereto, the controller 180 may store only the face image of the captured photo in the memory 160 or store the entire image of the photo including the face image in the memory 160. Also, the controller 180 may display a message inquiring about whether to perform updating on the display module 151 and store the recognized faces in different manners according to a user selection.

When a face of the captured image is not recognized or when the user does not want to store the recognized face in steps S53 and S54, the controller 180 displays a message inquiring about whether to store the captured photo on the display module 151. When the user selects photo storing, the controller 180 displays a message inducing inputting of a photo file name on the display module 151 and store an image captured in the file name inputted by the user in the memory 160 (S57).

In an exemplary embodiment of the present invention, as shown in FIG. 10, a face is automatically recognized in capturing a photo, but without being limited thereto, a face recognition may be performed when the user selects storing of a captured image.

Also, in a different exemplary embodiment, the controller 180 may recognize a face from a photo received from the computer 200 and recognize a face of the photo designated in the phone book among the photos stored in the memory 160. When the face of the photo received from the computer 200 is designated in the phone book and it is determined to be similar to the face of the photo stored in the memory 160, the controller 180 updates the photo stored in the memory 160 with the photo received from the computer 200 and, at the same time, the controller 180 may automatically update the photo of the corresponding photo field.

Figure 13:
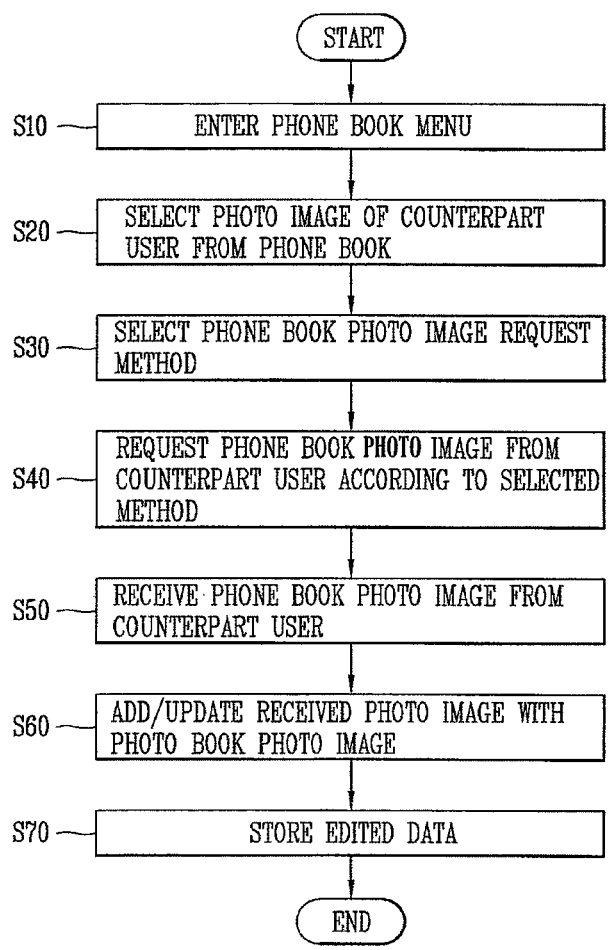
FIG. 13 is a flow chart illustrating the process of a method for managing a phone book photo of a mobile terminal according to a second exemplary embodiment of the present invention.

FIG. 13 is a flow chart illustrating the process of a method for managing a phone book photo of a mobile terminal according to a second exemplary embodiment of the present invention.

As shown in FIG. 13, when the user selects the phone book menu, the controller 180 enters the phone book menu and displays one or more user lists on the screen (S10). The user lists are displayed by users and groups, and a photo, name, phone number, e-mail address, and the like, of each user are displayed.

The user may select a counterpart user for which a photo is to be added or updated from the user list of the phone book (S20). When the user selects a photo of the counterpart user (through touch or click), the controller 180 outputs different guidance messages according to whether or not there is a photo currently.

Namely, when there is no phone book photo currently, the controller 180 outputs a message 'There is no phone book photo. Want to request phone book photo from the counterpart user?'. If there is a phone book photo currently, the controller 180 may output a message 'Want to request phone book photo (change) from counterpart user?' automatically or when change and delete items are displayed and the user selects the change item.

Once a phone photo is requested from the counterpart user, the controller 180 displays a communication method for requesting a phone book image, for example, a video call, a message (MMS or an e-mail) and an SNS, on the screen, and requests a phone book photo from the counterpart user according to a user selected communication method (S40). If the user transmits the message through the SMS, the controller 180 gives an ID indicating that the corresponding message is a phone book photo request message. When the user transmits the message via an e-mail, the controller 180 gives a tag to the message to indicate that the corresponding message is a phone book photo request message.

Once the phone book photo request is transmitted, receiving of the requested photo from the counterpart user (S50). When the phone book photo has been requested via a video call, the user may request or select of a photo of the desired counterpart user (in case of image capturing) while performing video call communication with the counterpart user.

Thereafter, when a photo is received from the counterpart user, the controller 180 adds the received photo of the counterpart user to the phone book or updates a corresponding photo in the phone book with the received photo. In this case, the controller 180 the controller 180 may immediately add or update the received photo as a photo of the counterpart user, or add or update it upon approval of the user 'a'.

The operation will now be described in detail.

Figure 14A:
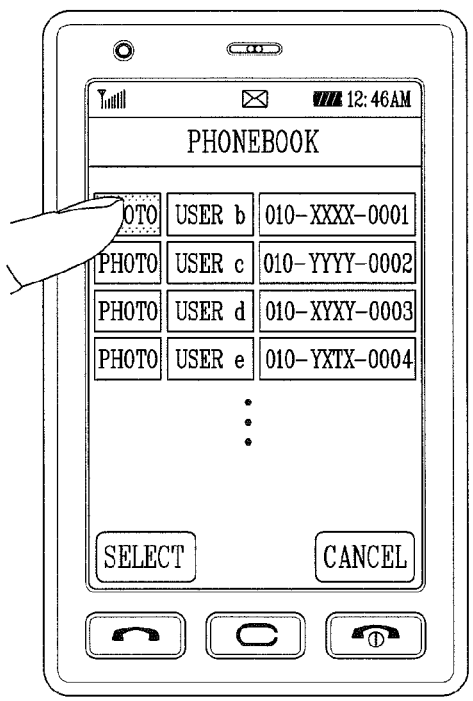
FIGS. 14a to 14c illustrate an example of requesting a phone book photo from a counterpart user and storing (registering and updating) it.
Figure 14B:
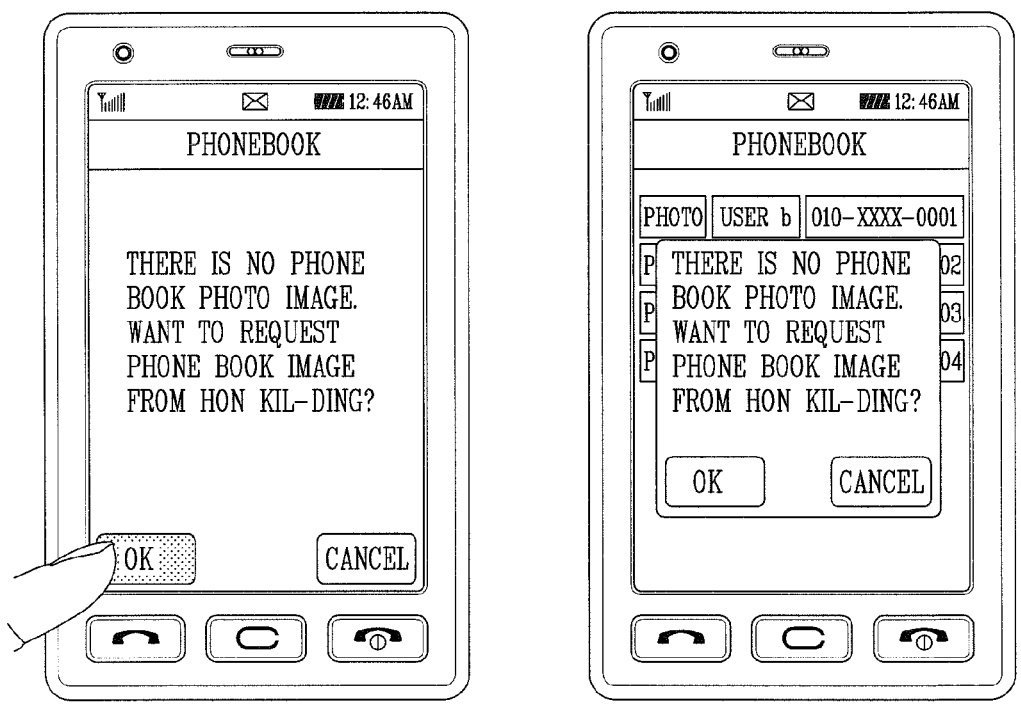
Figure 14C:
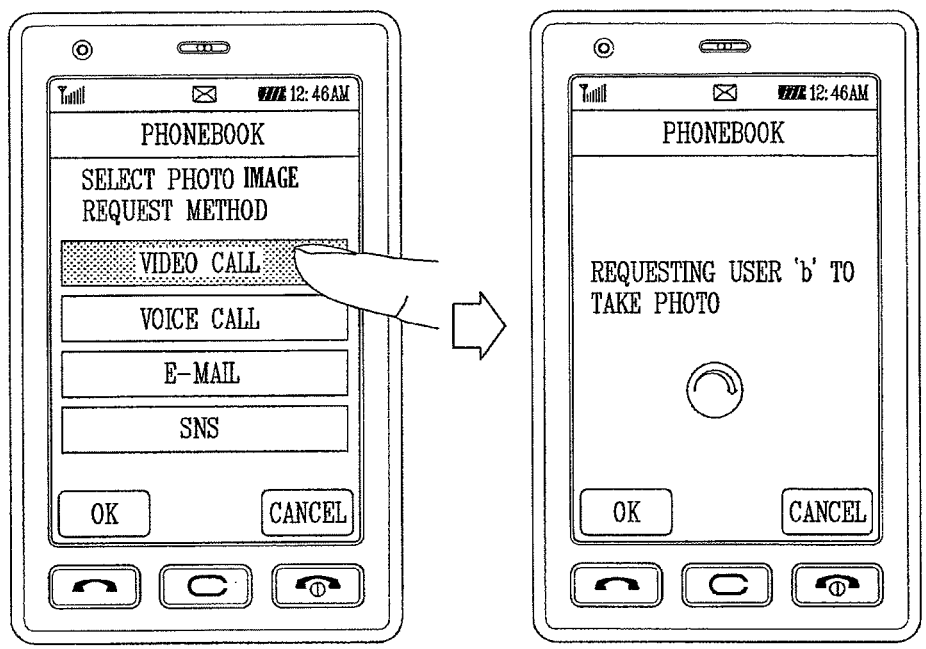

FIGS. 14a to 14c illustrate an example of requesting a phone book photo from a counterpart user and storing (registering and updating) it.

As shown in FIG. 14a, when the user 'a' selects the phone book menu, the display unit 151 displays a plurality of user records (user data lists) including photo, name, and phone number (or e-mail address). In this case, if a photo has been currently registered, the controller 180 may display a message inquiring about whether to perform updating, and if there is no registered photo, the controller 180 provides an option for receiving a photo from the counterpart. Namely, the user 'a' may register or update the photos or the users currently stored in the phone book by using a communication method with the counterpart user.

The communication method includes video call, e-mail, message (SMS, MMS), and SNS(Social Network Service). Here, the SNS is an online personal connections establishment service, including a concept covering one-person media, one-person community, information sharing, and the like. In particular, the SNS is a community type website established for the purpose of making more friends by allowing participants to introduce their friends to each other. The SNS has been receiving much attention as a new medium for years.

Namely, when the user 'a' selects a photo (photo field) of a user 'b' through a touch/proximity input or a keypad input, the controller 180 displays a photo of the user 'b' on the screen when the photo of the user 'b' is stored. If there is no stored photo of the user 'b', as shown in FIG. 14b, the controller 180 changes the screen to display a guidance message "There is no phone book photo. Want to request phone book photo from user 'b' (or user 'c')?" or displays the message in a pop-up window.

In this state, when the user 'a' requests a photo with respect to the user 'b', as shown in FIG. 14c, the controller 180 provides one or more menu options indicating methods for requesting the corresponding photo on the display unit 151. The menu options are methods for communicating with the user 'b', including a video call, a message (SMS or MMS), and an SNS.

Accordingly, when the user 'a' selects one of the video call, message (SMS or MMS), and the SNS displayed on the display unit 151, the controller 180 requests a photo from the user 'b' according to the selected communication method, and when the photo is received from the user 'b', the controller 180 automatically adds or registers the corresponding photo to the phone book.

Figure 15A:
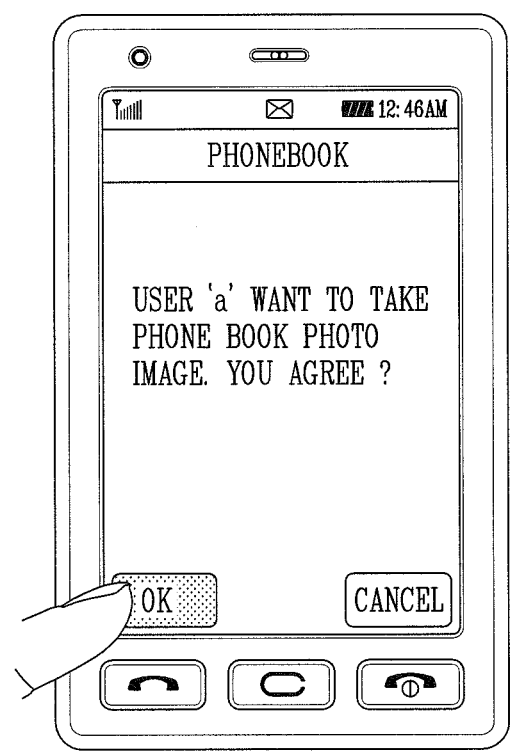
Figure 15C:
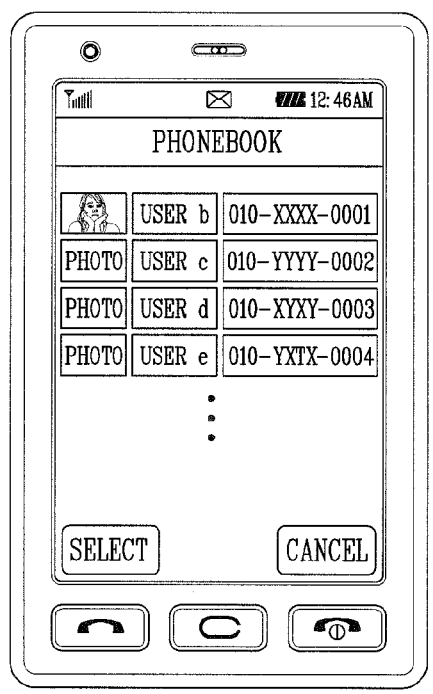

FIGS. 15a to 15c illustrate an example of a method for requesting and storing a phone book photo using a video call.

When the user 'a' selects the video call among the communication methods illustrated in FIG. 14c, the controller 180 displays a message "requesting user 'b' to take photo" and an icon indicating that the message request is proceeding on the display unit 151 of the user 'a'. The icon may be set to automatically disappear after the lapse of a certain time.

Meanwhile, a certain guidance message "User 'a' want to take a phone book photo, Want to consent?" indicating that taking picture has been requested on the display unit 151 of the mobile terminal of the user 'b'.

When the user 'b' accepts taking photo, the controller 180 of the terminal of the user 'b' is changed to an image capture mode, and the user 'b' may perform various poses for capturing images according to a voice instruction of the user 'a' during the video call communication. In this case, if the user 'a' does not like a captured photo, he may instruct not to store the corresponding photo.

As shown in FIG. 15b, the user 'b' performs image capturing operation or re-capturing operation according to an instruction of the user 'a' and transmits a finally captured photo to the user 'a'. In this case, a message indicating a proceeding state of image capturing, namely, a guidance message "Wait for receiving approval of photo storage from user 'b'" may be displayed on the terminal of the user 'a'.

Accordingly, when taking a photo is terminated finally after performing image capturing or re-capturing operation is performed, the user 'b' transmits a corresponding photo to the user 'a', and as shown in FIG. 15c, the controller 180 of the terminal of the user 'a' automatically adds the corresponding photo as a photos of the user 'b' of the phone book.

Figure 16:
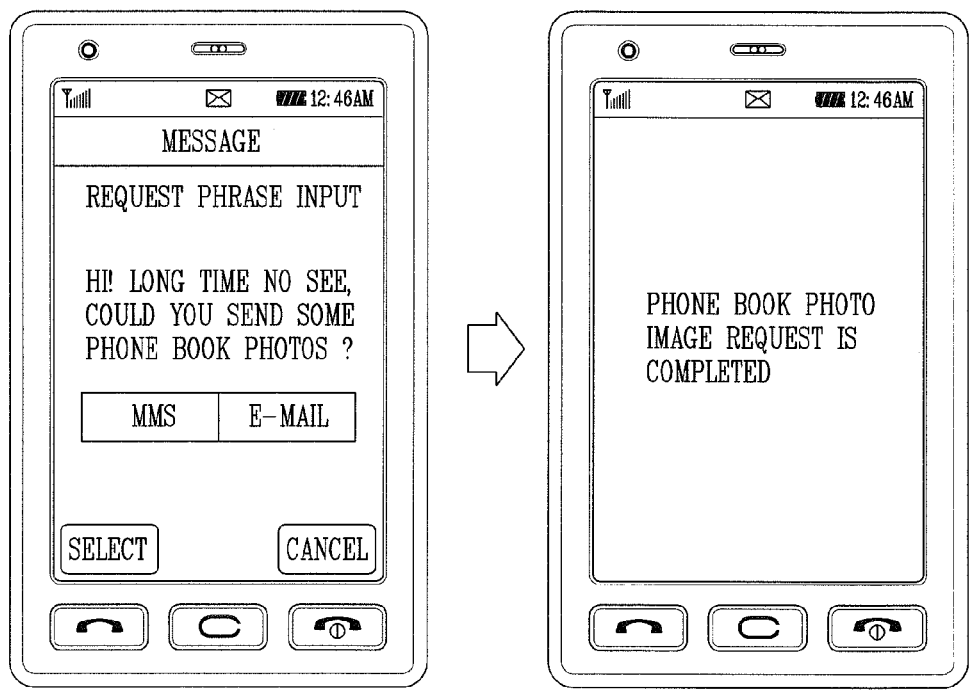
FIG. 16 illustrates an example of a method for requesting a phone book photo using a message.
Figure 17:
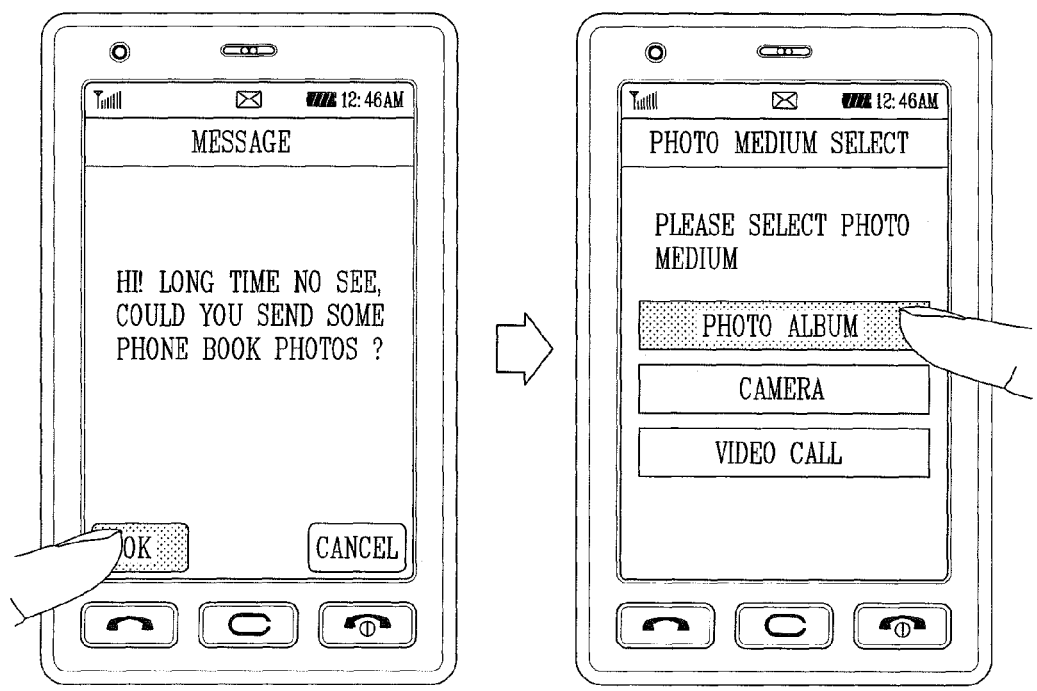
FIG. 17 illustrates an operation of a user 'b' who has received a request of a phone book photo.

FIG. 16 illustrates an example of a method for requesting a phone book photo using a message;

FIG. 17 illustrates an operation of a user 'b' who has received a request of a phone book photo.

As shown in FIG. 16, the user 'b' receives a message requesting a phone book photo from the user 'a', the controller 180 of the terminal of the user 'b' discriminates what kind of message it is. Namely, when the message transmitted by the user 'a' is an SMS message, the controller 180 may discriminate the corresponding message is a phone book photo request message based on a message ID, and when the corresponding message is an e-mail, the controller 180 may discriminate the corresponding message is a phone book photo request message through a predefined tag.

The controller 180 displays the discriminated phone book photo request message on the display unit 151 and waits for an approval of the user 'b'. When the user 'b' permits the request of a photo of the user 'a', the controller 180 provides one or more menus for selecting a photo medium. The photo medium selection menu includes a photo album, a camera, and a video call.

Figure 18A:
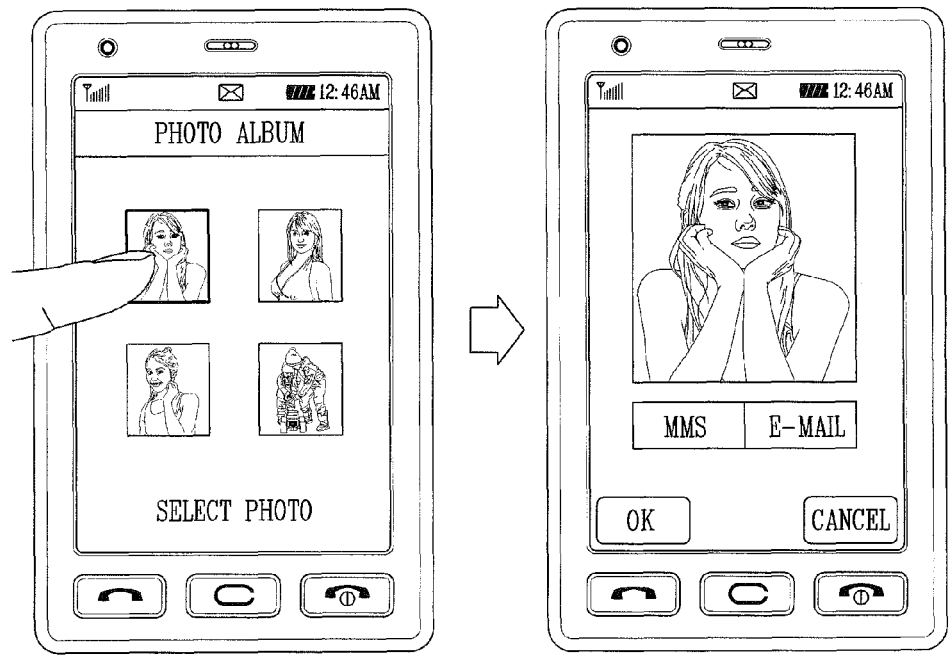
FIGS. 18a to 18c illustrate a method for transmitting a photo of the user 'b' using a photo album, a camera, and a video call.
Figure 18B:
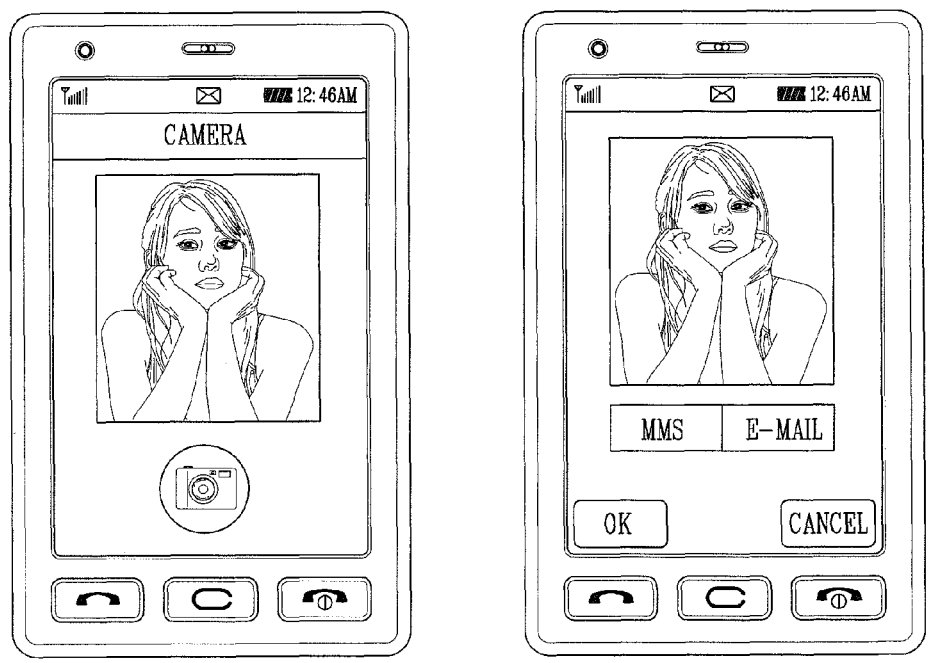
Figure 18C:
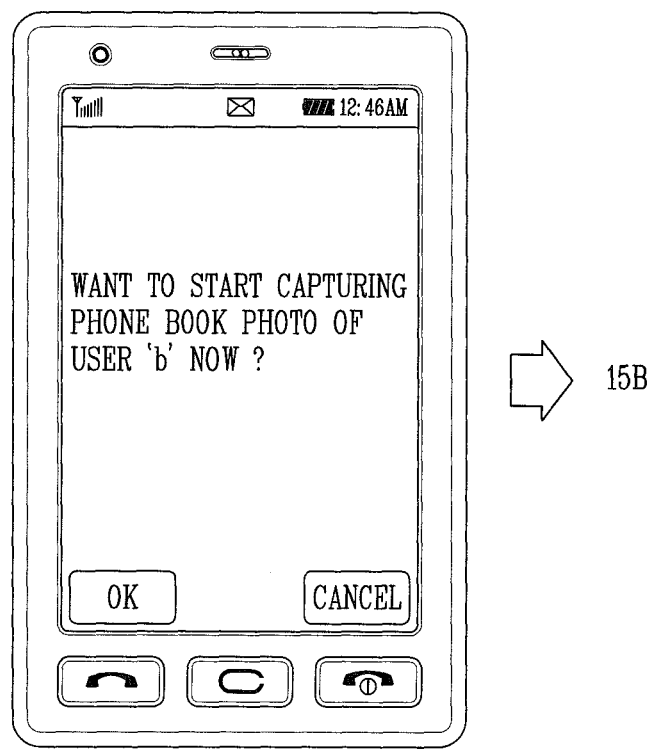

FIGS. 18a to 18c illustrate a method for transmitting a photo of the user 'b' using a photo album, a camera, and a video call.

When the user 'b' selects the photo album from the photo medium selection menu, as shown in FIG. 18a, the controller 180 changes to the photo album menu and displays one or more photos of the user 'b' on the display unit 151.

When the user 'b' selects the camera from the photo medium selection menu, as shown in FIG. 18b, the controller 180 changes to a camera capture mode to allow the user 'b' to take a photo.

Accordingly, the user 'b' transmits a photo selected from the photo album menu or the photo captured in the camera capture mode to the user 'a' through an MMS or an e-mail, and when a photo from the user 'b' arrives, the controller 180 of the user 'a' displays a guidance message "Want to add photo of user 'b' to phone book photo? to the user 'a' so that the user 'a' can selectively add the phone book photo.

When the user 'b' selects a video call from the photo medium selection menu, the terminal of the user 'b' requests a video call from the terminal of the user 'a', and as shown in FIG. 18c, a guidance message "Want to start phone book photo taking of user 'b' now? on the display unit 151 of the user 'a'. Thereafter, as described above with reference to FIG. 15b, the user 'b' captures a photo of a pause or look desired by the user 'a' and transmits the corresponding photo to the user 'a' while performing video call communication with the user 'a'.

Figure 19A:
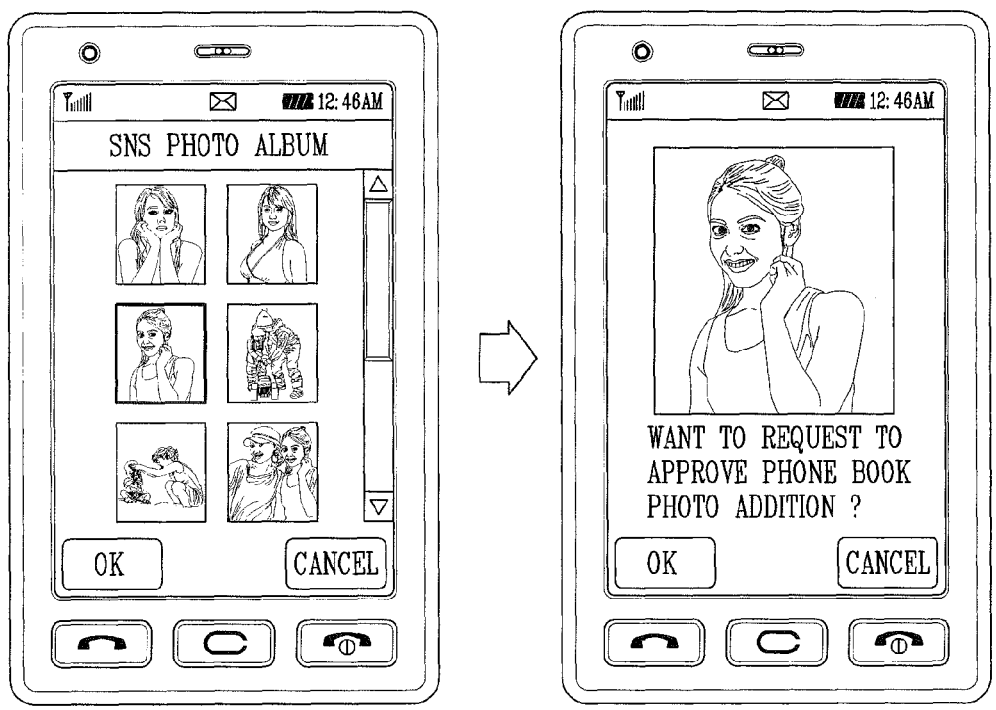
FIGS. 19a to 19c illustrate an example of a method for requesting a phone book photo using an SNS.
Figure 19B:
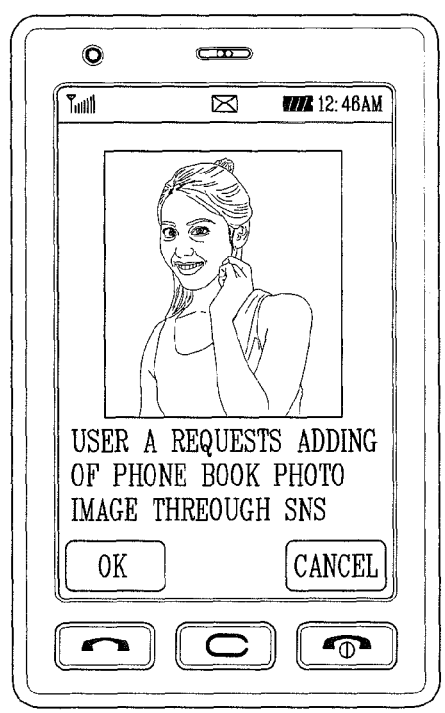
Figure 19C:
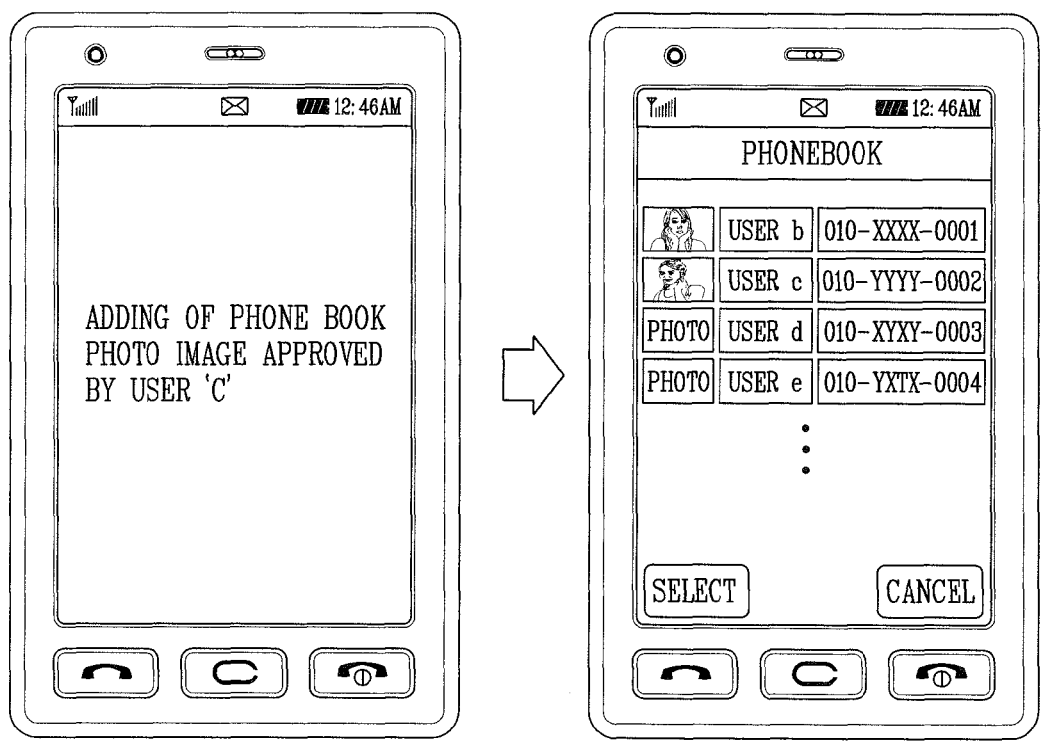

FIGS. 19a to 19c illustrate an example of a method for requesting a phone book photo using an SNS. In the present exemplary embodiment, a user 'c' will be taken as an example.

As shown in FIG. 19a, when the user 'a' selects SNS from among the communication methods (menu option) illustrated in FIG. 15c, the controller 180 accesses the SNS of the user 'c' (or user 'b') and then displays an SNS photo album of the user 'c' on the display unit 151. When the user 'a' selects a certain photo from the photo album, the controller 180 of the user 'a' displays a message "Want to request approval of adding phone book photo" to the user 'c' on the screen.

When the user 'a' selects OK with respect to the message, the controller 180 transmits a phone book photo addition request message to the terminal of the user 'c', and as shown in FIG. 19b, the controller 180 of the terminal of the user 'c' displays a notification message that the user 'a' has requested a phone book photo addition from the SNS to the user 'c'.

When the user 'c' approves adding of a phone book photo from the SNS in response to the notification message, a notification message indicating that a phone book photo addition is approved, namely, a message "Adding of phone book photo is approved by user 'c'" is displayed on the screen of the terminal of the user 'a' as shown in FIG. 19c, and a photo of the user 'c' selected from the SNS photo album is added to the phone book.

Figure 20A:
FIGS. 20a and 20b illustrate a method for storing a phone book photo during video call communication.
Figure 20B:
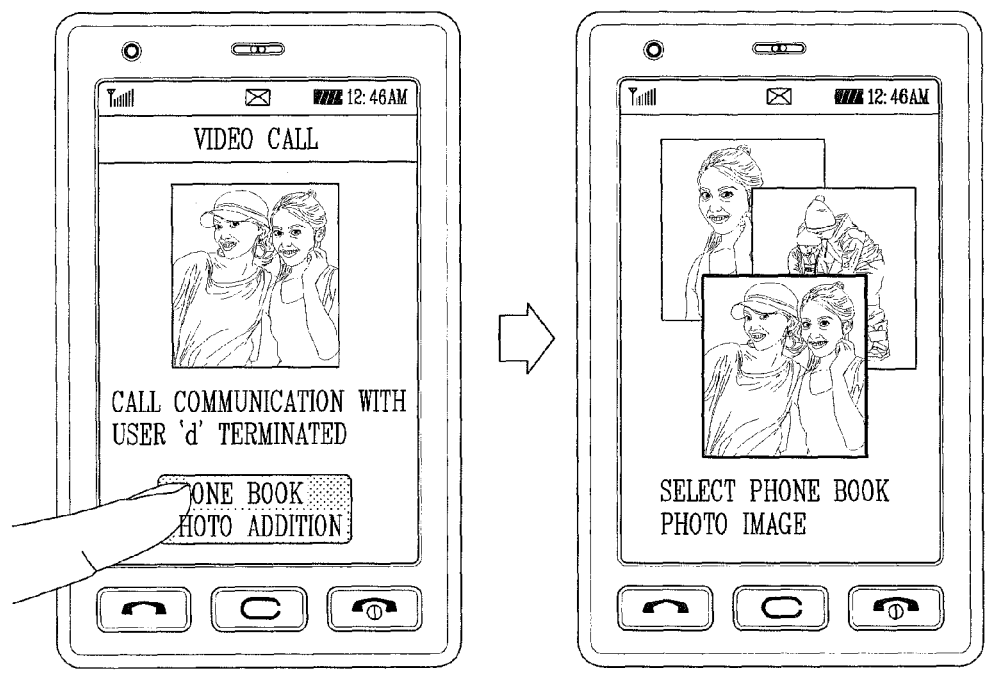

FIGS. 20a and 20b illustrate a method for storing a phone book photo during video call communication.

As shown in FIG. 20a, when the user 'a' and a user 'd' perform video call communication, the figure of the counterpart user 'd' is displayed on the screen. The user 'a' stores a figure of the user 'd' the user 'a' likes during the video call communication.

Also, in an exemplary embodiment of the present invention, it may be set such that a figure of the user 'd' is automatically stored. The setting may be made in a video call menu. For example, when the face of the user 'd' is recognized during video call communication, the controller 180 may automatically store the shape of the counterpart according to a menu setting, and in addition, the controller 180 may store the shape of the counterpart at certain intervals during the video call communication.

The photos stored in this manner are displayed at a certain display area of a lower end of the display unit 151, and the photos stored in the display area may be shifted through a scroll bar.

Thereafter, when the video call with the user 'd' is terminated, as shown in FIG. 20b, the controller 180 displays a message indicating that the video call has been terminated and a 'phone book photo addition' item on the screen. When the user 'a' selects the 'phone book photo addition' item, the controller 180 displays the photos of the user 'd' which have been stored during the video call communication such that they overlap by the records (lists) or according to the capturing order. Thus, the user 'a' can select one shape to be used as a phone book photo from among the displayed shapes of the video call communication with the user 'd' and stores the selected shape as a phone book photo.

In the present invention, the case where a photo of a particular user is not stored in the phone book has been described, but a photo of a user whose photo has been registered can be also requested from the counterpart user and updated. In this case, when a photo to be updated is selected in FIG. 20a, the controller 180 may provide an update and delete item with respect to the corresponding photo.

If the user 'a' selects an update item, a photo can be received from the counterpart user to update a currently stored photo by using the foregoing method.

Figure 21A:
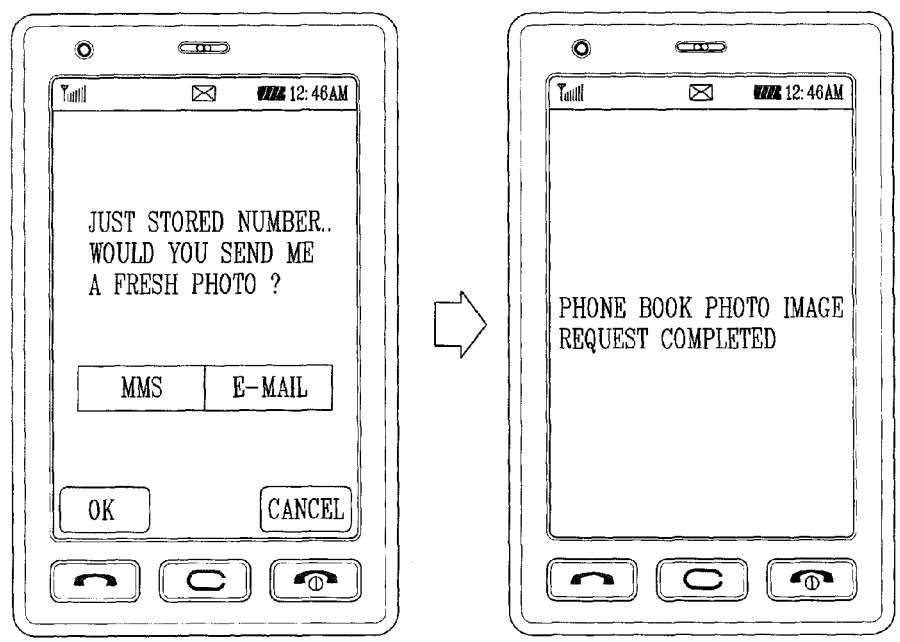
FIGS. 21a and 21b illustrate an example of requesting a photo from a counterpart user after registering a phone number.
Figure 21B:
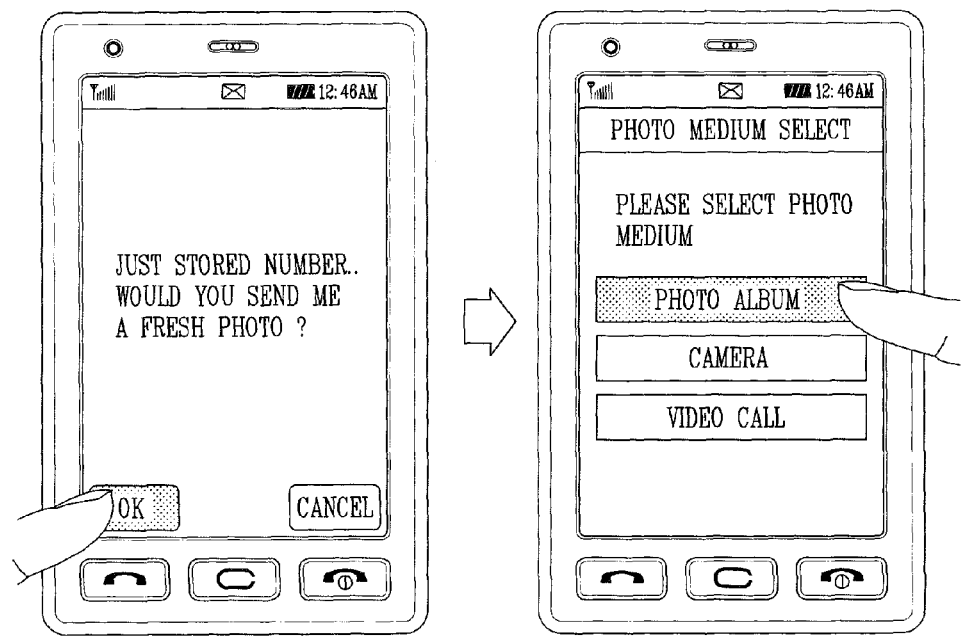

FIGS. 21a and 21b illustrate an example of requesting a photo from a counterpart user after registering a phone number.

With reference to FIG. 21a, when call communication with the user 'b' is terminated, the user 'a' registers (stores) the phone number of the user 'b' in a phone book. When the phone number registration is completed, the user 'a' enters a text message menu and creates a request phrase to be transmitted to the user 'b', for example, a message "I've just stored the phone number . . . Would you send me a fresh photo?". When the creation of the phrase is completed, the user 'a' transmits the corresponding phrase to the user 'b' through MMS or an e-mail. At this time, the controller 180 displays a message indicating that the request of a phone book photo has been completed on the display unit 151.

Also, when there is no image with respect to the registered phone number, the controller 180 automatically changes to a message creation menu to allow the user 'a' to request a photo of the user 'b'. Namely, when the phone number is stored, the controller 180 may automatically informs the counterpart accordingly and request a photo.

In requesting a photo, the controller 180 transmits information indicating that a corresponding message is a photo request message, for example, when a phone book photo request phrase is transmitted through an SMS message, the controller 180 discriminates a message ID and transmits the message, and when the controller 180 requests the photo through an e-mail, it attaches a tag so that the terminal of the user 'b' can be discriminated and transmits the message.

As shown in FIG. 20b, when the message requesting a phone book photo is received from the user 'a', the controller 180 of the terminal of the user 'b' discriminates what kind of the corresponding message is. Namely, when the message transmitted by the user 'a' is an SMS message, the controller 180 of the terminal of the user 'b' discriminates that the corresponding message is a phone book photo request message based on a message ID, and when the message transmitted by the user 'a' is an e-mail, the controller 180 of the terminal of the user 'b' discriminates that the corresponding message is a phone book photo request message through a predefined tag.

The controller 180 displays the discriminated phone book photo request message on the display unit 151 and waits for an approval of the user 'b'. When the user 'b' permits the request of a photo from the user 'a', the controller 180 provides one or more menus for selecting a phone medium to the user 'b'. The photo medium selection menu includes a photo album, a camera, and a video call.

The follow-up operation is the same as described, so a detailed description thereof will be omitted.

In an exemplary embodiment of the present invention, when a photo is requested from a counterpart, an image including a geographical tag may be requested so as to be used as an identifier for receiving a service such as a road guidance by searching a corresponding place, such as home or an office, afterwards.

The message requesting an image including the geographical tag may be given an ID so that it can be discriminated from a general photo request message, and a predefined tag may be attached thereto.

When a geographical tag message is received from the counterpart in response to the photo request, the controller 180 automatically stores content related to the position of the address field, namely, a photo capture location, as well as storing a photo of the counterpart in the phone book. The phone book photo and the image capture position are linked, so that when the user clicks the photo, it is displayed along with the corresponding position.

In an exemplary embodiment of the present invention, when video call communication is performed, as shown in FIGS. 19a and 19b, a desired figure of a counterpart can be stored during the video call communication to use it as a phone book photo.

In this case, the desired figure of the counterpart can be arbitrarily selected by the user 'a', or an image satisfying certain conditions may be automatically captured and stored.

For example, when a (predetermined) look of the user 'b' desired by the user 'a', like a smile shot, is generated during the video call communication, the controller 180 automatically stores the corresponding image. In this case, the captured image can be displayed on the screen during the video call communication or may be displayed only when the call is terminated as shown in FIGS. 20a and 20b.

Also, in an exemplary embodiment of the present invention, rather than capturing certain figures of all the people while performing video communication with the counterpart, a corresponding figure is captured when conditions set by the user 'a' is met. The set conditions are as follows.

A user permitted for image capturing,
A predefined user
A user whose photo is not in the phone book
A user, friend, family member having an SNS relationship
A person whose speed number or phone number is in the phone book
A user with which the user has performed call communication by more than a certain value.

Figure 22:
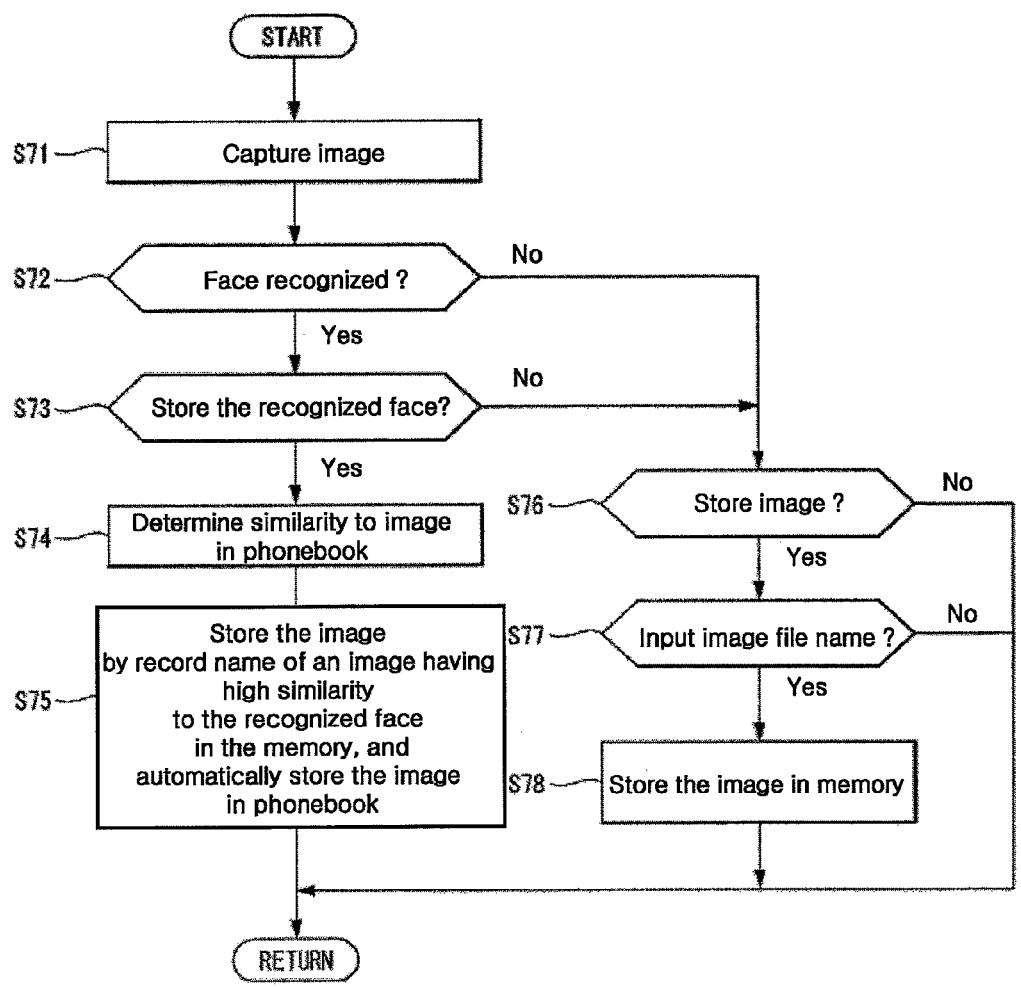
FIG. 22 is a flow chart illustrating an example of storing a photograph (or an image) in a phone book according to results of recognizing faces in an image captured by the mobile terminal.
Figure 23:
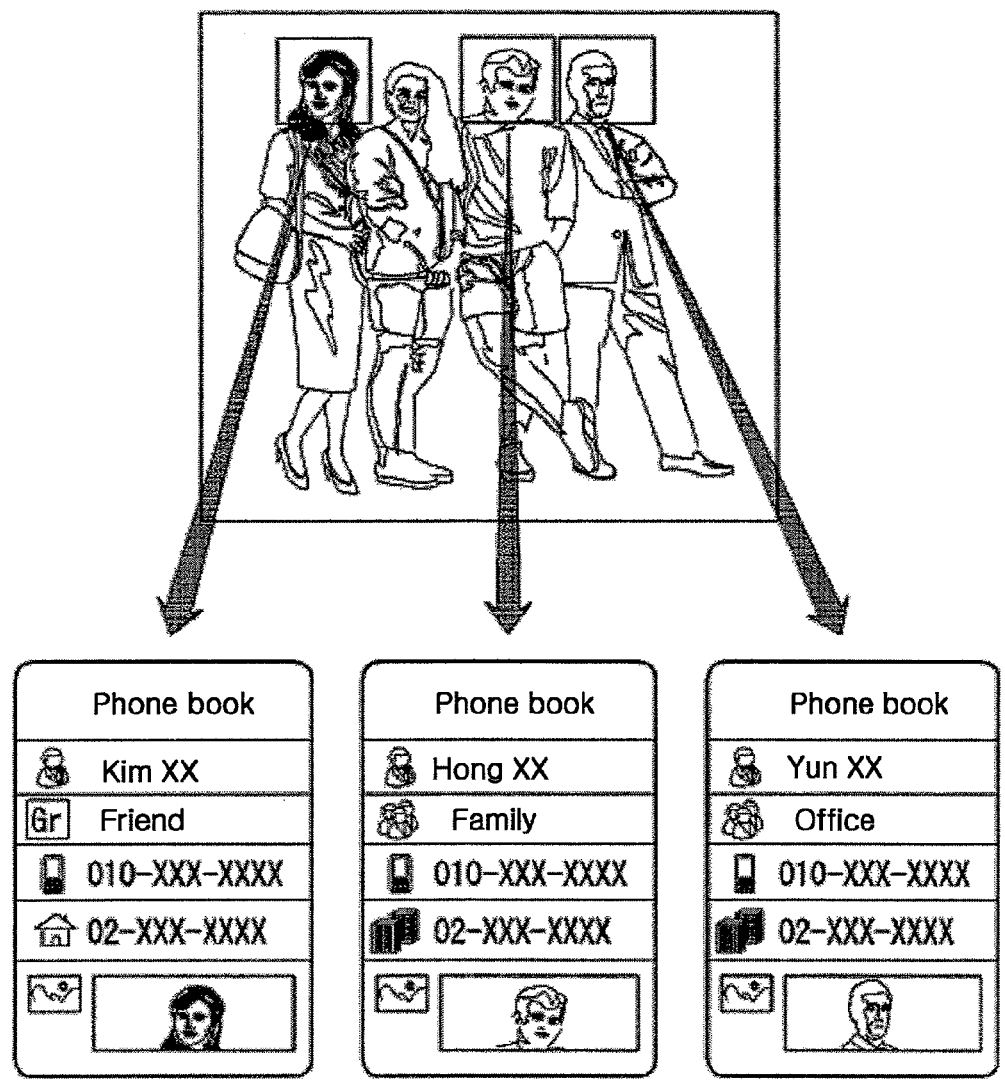
FIG. 23 illustrates an example of a photograph (or an image) stored in a phone book according to results of recognizing faces in an image captured by the mobile terminal.

In still another embodiment, FIGS. 22 and 23 illustrate an example of a photograph (or an image) stored in a phone book according to results of recognizing faces in an image captured by the mobile terminal 100. Referring to FIGS. 22 and 23, the user may capture an image by using the mobile terminal 100 (S71). When capturing starts by the user, the controller 180 executes a face recognition program to automatically recognize a face in a captured image (S72).

When a face in the image captured by the mobile terminal 100 is recognized, the controller 180 displays a message asking whether to store the recognized face(s) on the display module 151 (S73). When the user selects 'store recognized face', the controller 180 recognizes faces of images stored in the memory 160, compares the faces of the stored images and the faces recognized from the newly captured image, and determines similarity therebetween (S74).

When similarity of the recognized face to the stored image is equal to or higher than a predetermined threshold value and the image having high similarity to the recognized face is determined as an image designated in a photo field of the phone book, the controller 180 automatically stores the recognized face in a corresponding record name in the memory 160. Simultaneously, the controller 180 automatically updates the image designated in the photo field of the corresponding record of the phone book with the image of the recognized face (S75). In step S75, the controller 180 may store only the face image of the captured image in the memory 160 or may store the entire image including the face image in the memory 160. In step S75, the controller 180 may display a message asking the user about whether to perform updating on the display module 151 and differently store the recognized faces according to a user selection.

In steps S72 and S73, when the face in the image captured by the mobile terminal 100 is not recognized or when the user does not want to store the recognized face, the controller 180 displays a message asking whether to store the captured image on the display module 151 (S76). When the user selects 'store image', the controller 180 may display a message guiding input of a photo file name on the display module 151, and when a file name is input by the user, the controller 180 stores the image in the memory 160 (S78).

Also, the respective exemplary embodiments have been separately described for the sake of explanation, but the operations of the exemplary embodiments may be combined to be used. Namely, when there is no photo to be stored in the first exemplary embodiment, a phone book photo can be received from an external source by using the operation of the second exemplary embodiment. Also, when there is no photo in the photo field in the second exemplary embodiment of the present invention, before requesting a photo book photo from an external source, the storage information of the phone book or the memory may be searched, and if there is a desired photo, the operation as in the first exemplary embodiment of the present invention may be performed.

As so far described, in the exemplary embodiments of the present invention, the file name of a photo received from the external source or a captured photo are compared with the phone book information and automatically stored in the phone book, thereby minimizing the user manipulation and the process of storing the photo data of the phone book.

Also, the photo of a counterpart stored in the phone book (or not stored in the phone book) is remotely requested by using various functions of the mobile terminal, and a phone book photo can be added or updated, thus more conveniently managing the phone book data.

In an exemplary embodiment of the present invention, the above-described method can be implemented as software codes that can be read by a computer in a program-recorded medium. The computer-readable medium may include various types of recording devices in which data that can be read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). In addition, the computer may include the controller 180 of the terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A method for managing phone book data of a mobile terminal, the method comprising:
displaying a phone book search screen;
comparing a file name of a photo to be stored with a record name of a phone book when photo storage is executed in the phone book search screen; and
automatically designating a photo having the same file name as the record name of the phone book in a photo field of the phone book,
wherein the automatically designating of the photo comprises:
updating information of the photo field with a photo received from an external source or a captured image when a different photo is designated in the photo field of the phone book, and
wherein the updating of the information of the photo field comprises:
recognizing a face from a received photo or a captured image;
recognizing a face of a designated photo in the photo field of the phone book;
calculating a similarity between the recognized face of the received photo or the captured photo and the face of the designated photo; and
updating the information of the photo field of the phone book with the recognized face of the received photo or the captured photo when the calculated similarity is higher than a certain threshold value.

2. The method of claim 1, wherein the automatically designating of the photo further comprises:
storing a photo having the same file name as the record name of the phone book in a memory; and
storing access path information of the stored photo in the photo field of the phone book.

3. The method of claim 2, wherein the automatically designating of the photo further comprises:
storing the photo with a plurality of record names of the phone book in the memory; and
simultaneously designating the photo in the photo field of each record.

4. A mobile terminal, comprising:
a memory configured to display a phone book search screen;
a camera configured to capture a photo;
an interface unit configured to receive a photo from an external source; and
a controller configured to:
compare a file name of a photo received via the interface unit or captured by the camera with a record name of the phone book,
automatically designate a photo having the same file name as the record name of the phone book in a photo field of the phone book,
update information of the photo field with a received photo or a captured image when a different photo is designated in the photo field of the phone book,
store a photo having the same file name as the record name of the phone book in the memory and store access path information of the stored photo in the photo field of the phone book,
recognize a face in the received photo or the captured photo,
recognize a face of a designated photo in the photo field of the phone book,
calculate a similarity between the recognized face of the received photo or the captured photo and the face of the designated photo, and
update the information of the photo field with the recognized face of the received photo or the captured photo having the highest similarity with respect to the designated photo in the photo field of the phone book.

* * * * *